(12) United States Patent
Takano et al.

(10) Patent No.: US 9,845,111 B2
(45) Date of Patent: *Dec. 19, 2017

(54) VEHICLE

(71) Applicant: Yamaha Hatsudoki Kabushiki Kaisha, Iwata-shi, Shizuoka (JP)

(72) Inventors: Kazuhisa Takano, Shizuoka (JP); Shigeto Yamasaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/437,893

(22) PCT Filed: Oct. 24, 2013

(86) PCT No.: PCT/JP2013/078867
§ 371 (c)(1),
(2) Date: Apr. 23, 2015

(87) PCT Pub. No.: WO2014/065381
PCT Pub. Date: May 1, 2014

(65) Prior Publication Data
US 2015/0291241 A1    Oct. 15, 2015

(30) Foreign Application Priority Data

Oct. 25, 2012    (JP) .................... 2012-235605

(51) Int. Cl.
*B62D 9/02* (2006.01)
*B62K 5/05* (2013.01)
(Continued)

(52) U.S. Cl.
CPC .......... *B62D 9/02* (2013.01); *B60G 17/0162* (2013.01); *B60G 17/08* (2013.01); *B60G 21/05* (2013.01);
(Continued)

(58) Field of Classification Search
CPC ... B62D 9/00; B62D 9/02; B62D 9/04; B62D 7/224; B60G 17/0162; B60G 17/08;
(Continued)

(56) References Cited

U.S. PATENT DOCUMENTS 4,351,410 A    9/1982  Townsend
4,740,004 A    4/1988  McMullen
(Continued)

FOREIGN PATENT DOCUMENTS

CN         1654262 A       8/2005
DE   10 2010 052 716 A1    6/2011
(Continued)

OTHER PUBLICATIONS

Iizuka et al.; "Vehicle"; U.S. Appl. No. 14/430,357, filed Mar. 23, 2015.
(Continued)

*Primary Examiner* — Barry Gooden, Jr.
(74) *Attorney, Agent, or Firm* — Keating and Bennett, LLP

(57) ABSTRACT

A resisting force change mechanism includes a first portion and a second portion configured to change a resisting force against relative displacement. The first portion is supported on any one of a first side member, a second side member, a first cross member, and a second cross member of a link mechanism where at least a portion thereof is superposed on one member at all times. The first portion is aligned with the one member and a steering shaft at the front. The second portion is supported on any other one of the body frame, the first side member, the second side member, the first cross member, and the second cross member that is displaced relative to the one member on which the first portion is (Continued)

supported. The second portion is located at a position where at least a portion thereof is superposed on the other member at all times.

6 Claims, 21 Drawing Sheets

(51) Int. Cl.
| | |
|---|---|
| *B62K 5/10* | (2013.01) |
| *B62K 5/08* | (2006.01) |
| *B62K 21/00* | (2006.01) |
| *B60G 21/055* | (2006.01) |
| *B60G 17/016* | (2006.01) |
| *B60G 17/08* | (2006.01) |
| *B60G 21/05* | (2006.01) |
| *B62K 5/027* | (2013.01) |

(52) U.S. Cl.
CPC .......... *B60G 21/0553* (2013.01); *B62K 5/027* (2013.01); *B62K 5/05* (2013.01); *B62K 5/08* (2013.01); *B62K 5/10* (2013.01); *B62K 21/00* (2013.01); *B60G 2200/44* (2013.01); *B60G 2204/82* (2013.01); *B60G 2204/83* (2013.01); *B60G 2300/12* (2013.01); *B60G 2300/122* (2013.01); *B60G 2300/45* (2013.01); *B60G 2800/012* (2013.01)

(58) Field of Classification Search
CPC ................ B60G 21/05; B60G 2204/82; B60G 2204/8302; B60G 2300/12; B60G 2300/122; B60G 2300/45; B60G 2800/012; B62K 5/05; B62K 5/027; B62K 5/08; B62K 5/10; B62K 21/18; B62K 21/20; B62K 2700/22
See application file for complete search history.

(56) References Cited

U.S. PATENT DOCUMENTS

| | | | |
|---|---|---|---|
| 6,367,824 B1 | 4/2002 | Hayashi | |
| 6,817,617 B2* | 11/2004 | Hayashi | B62K 5/05 280/124.1 |
| D547,242 S | 7/2007 | Lambri | |
| 7,264,251 B2* | 9/2007 | Marcacci | B60G 17/0152 280/124.103 |
| 2004/0140645 A1 | 7/2004 | Hayashi | |
| 2005/0167174 A1 | 8/2005 | Marcacci | |
| 2005/0167217 A1* | 8/2005 | Marcacci | B60G 15/063 188/300 |
| 2006/0097471 A1 | 5/2006 | Van Den Brink et al. | |
| 2006/0151232 A1 | 7/2006 | Marcacci | |
| 2010/0194068 A1* | 8/2010 | Henderson | B62D 9/02 280/124.103 |
| 2010/0314852 A1 | 12/2010 | Chin et al. | |
| 2013/0168944 A1* | 7/2013 | Bartolozzi | B62D 9/02 280/269 |
| 2014/0204598 A1* | 7/2014 | Di Tanna | B60Q 1/12 362/460 |
| 2015/0307149 A1* | 10/2015 | Iizuka | B62K 19/38 280/267 |

FOREIGN PATENT DOCUMENTS

| | | |
|---|---|---|
| EP | 1 090 832 A1 | 4/2001 |
| EP | 2 368 729 A1 | 9/2011 |
| GB | 1040389 A | 8/1966 |
| JP | 2002-337779 A | 11/2002 |
| JP | 2005-313876 A | 11/2005 |
| JP | 2006-160254 A | 6/2006 |
| JP | 2008-132933 A | 6/2008 |
| JP | 2010-167999 A | 8/2010 |
| JP | 2010-184508 A | 8/2010 |
| JP | 2010-228551 A | 10/2010 |
| JP | 2011-195099 A | 10/2011 |
| TW | 201117997 A1 | 6/2011 |
| WO | 03/101817 A1 | 12/2003 |
| WO | 2004/011324 A1 | 2/2004 |
| WO | 2005/058680 A1 | 6/2005 |
| WO | 2009/059099 A2 | 5/2009 |
| WO | 2012/007819 A1 | 1/2012 |

OTHER PUBLICATIONS

Takano et al.; "Vehicle"; U.S. Appl. No. 14/437,899, filed Apr. 23, 2015.
Official Communication issued in International Patent Application No. PCT/JP2013/078867, dated Jan. 21, 2014.
Piaggio, "Catalogo Parti Di Ricambio", NTRC000U01, MP3 300 ie LT Mod. ZAPM64102, 116 pages.
Official Communication issued in corresponding European Patent Application No. 13848225.2, dated Sep. 18, 2015.

* cited by examiner

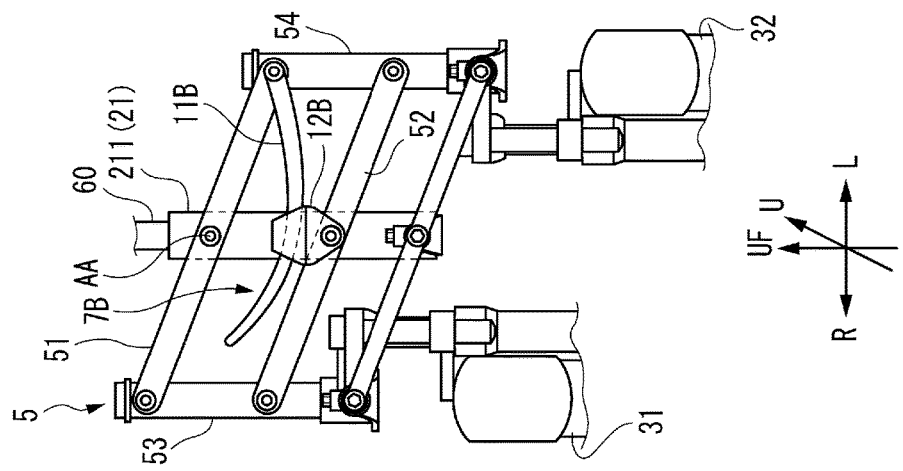
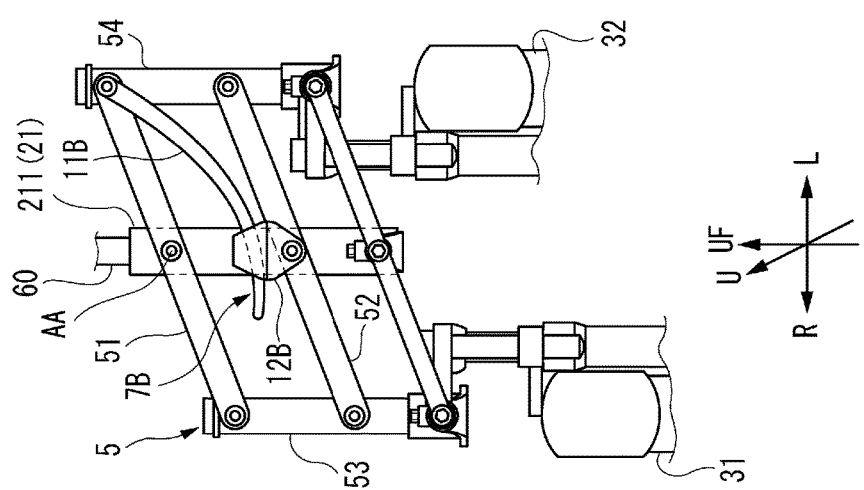
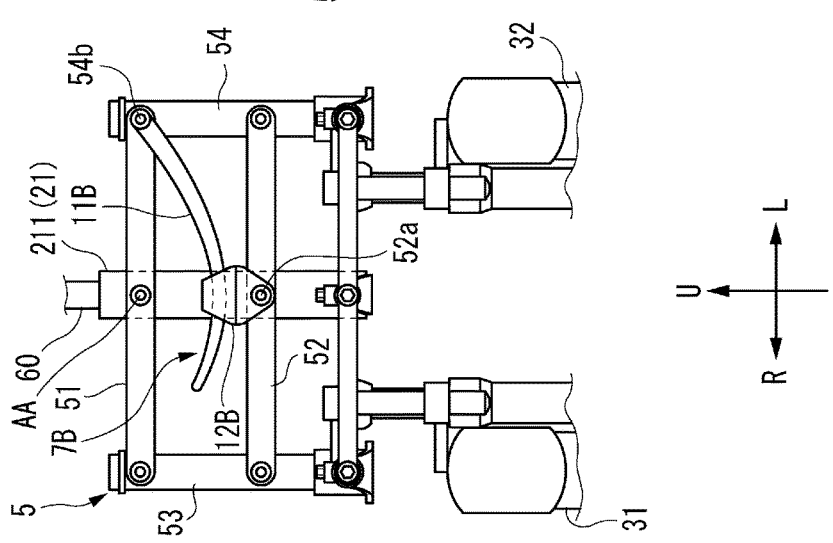

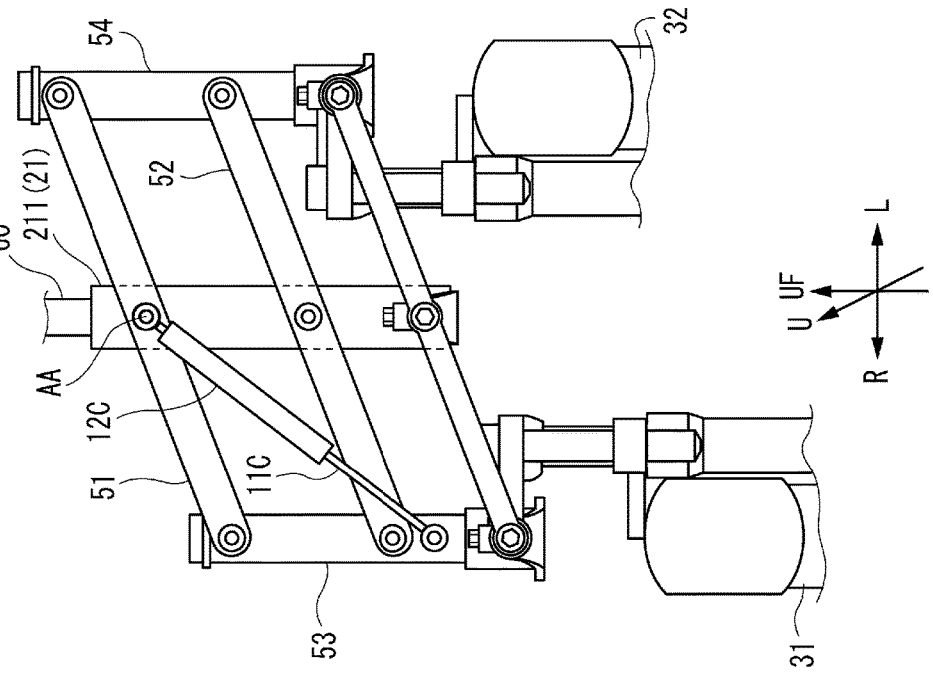
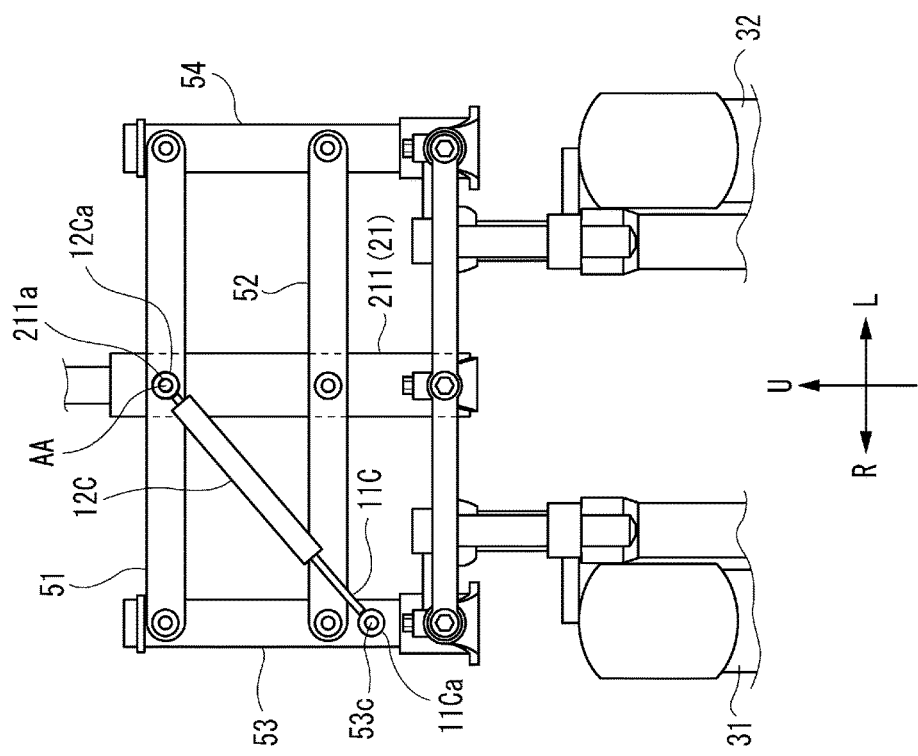

VEHICLE

BACKGROUND OF THE INVENTION

1. Field of the Invention

The present invention relates to a vehicle including a body frame that leans and two front wheels.

2. Description of the Related Art

A known vehicle includes a body frame that leans leftward or rightward while the vehicle is cornering and two front wheels that are aligned side by side in a left-and-right direction of the body frame (for example, refer to Japanese Patent Unexamined Publication JP-A-2005-313876, German Patent Application No. 10 2010 052 716, U.S. Design Patent D547,2425, and Catalogo partidi ricambio, MP3 300 64102 ie LT Mod. ZAPM64102, Piaggio).

The vehicle including the body frame that can lean and the two front wheels includes a link mechanism. The link mechanism includes an upper cross member and a lower cross member. In addition, the link mechanism also includes a right side member which supports right end portions of the upper cross member and the lower cross member and a left side member which supports left end portions of the upper cross member and the lower cross member. The upper cross member and the lower cross member are supported on the body frame at their middle portions in front of a steering shaft. The upper cross member and the lower cross member are supported on the body frame so as to be turnable about axes extending substantially in a front-and-rear direction of the body frame. The upper cross member and the lower cross member turn relative to the body frame as the body frame leans, such that the relative positions of the two front wheels in an up-and-down of the body frame change. The upper cross member and the lower cross member are located above the two front wheels in the up-and-down direction of the body frame in an upright state of the body frame.

The vehicle including the body frame that can lean and the two front wheels includes a right shock absorbing device which supports the right front wheel so as to move in the up-and-down direction of the body frame and a left shock absorbing device which supports the left front wheel so as to move in the up-and-down direction of the body frame. The right shock absorbing device is supported on the right side member so as to turn about the axis of the right side member. The left shock absorbing device is supported on the left side member so as to turn about the axis of the left side member. Vehicles described in Japanese Patent Unexamined Publication JP-A-2005-313876 and German Patent Application No. 10 2010 052 716 further include a handlebar, a steering shaft, and a turn transfer mechanism. The handlebar is fixed to the steering shaft. The steering shaft is supported on the body frame so as to turn relative thereto. When the handlebar is turned, the steering shaft also turns. The turn transfer mechanism transfers the turning motion of the steering shaft to the right shock absorbing device and the left shock absorbing device.

The vehicle including the body frame that can lean and the two front wheels includes a number of on-board components which are provided around the periphery of the steering shaft. The on-board components include lamps such as a headlamp, a radiator, a reservoir tank, electric components such as a horn, a main switch of the vehicle, a storage box, a storage pocket and the like.

The vehicles described in Japanese Patent Unexamined publication JP-A-2005-313876 and German Patent Application No. 10 2010 052 716 include a resisting force change mechanism. The resisting force change mechanism suppresses the leaning of the body frame and the change in relative position of the two front wheels in the vertical direction of the body frame by increasing a resisting force against the operation of the link mechanism.

In the vehicle described in Japanese Patent Unexamined publication JP-A-2005-313876, the resisting force change mechanism includes a brake disc and a caliper. The brake disc is fixed to the upper cross member of the link mechanism. The caliper changes the resisting force that is exerted on the link mechanism by controlling the frictional force between the caliper and the brake disc. The caliper is attached to the body frame at a location above the upper cross member. The link mechanism operates when the resisting force exerted by the resisting force change mechanism is zero or small. When the resisting force exerted by the resisting force change mechanism is large, the operation of the link mechanism is suppressed or stopped. When the resisting force exerted by the resisting force change mechanism is zero or small, the brake disc and the upper cross member move together relative to the body frame.

In the vehicle described in German Patent Application No. 10 2010 052 716, the resisting force change mechanism includes a rod, a piston that is provided at one end of the rod, and a cylinder in which the piston moves. In the resisting force change mechanism, the rod extends or contracts in relation to the cylinder as a result of the piston moving within the cylinder. The rod stays stationary in relation to the cylinder as a result of the piston stopping within the cylinder. The other end of the rod is supported on the left member. The cylinder is supported on the body frame at a location above the upper cross member. The resisting force change mechanism changes the resisting force against the link mechanism by changing the moving state of the piston within the cylinder. The link mechanism operates when the resisting force exerted by the resisting force change mechanism is zero or small. When the resisting force exerted by the resisting force change mechanism is large, the operation of the link mechanism is suppressed or stopped. The rod and the cylinder also move as the link mechanism operates when the resisting force exerted by the resisting force change mechanism is zero or small.

The vehicles described in Japanese Patent Unexamined Publication JP-A-2005-313876 and German Patent Application No. 10 2010 052 716 include a link mechanism that is provided around the periphery of the steering shaft, and this link mechanism moves as the body frame leans. In addition, the vehicles include on the periphery around the steering shaft the resisting force change mechanism which operates as the body frame leans and the link mechanism operates. Because of this, in a vehicle including a body frame that can lean and the two front wheels, the resisting force change mechanism needs to be provided so that the movable range of the link mechanism and the large movable range of the resisting force change mechanism do not interfere with each other. Further, in providing on-board components, it is necessary that the on-board components are provided so as to avoid the interference with both the movable range of the link mechanism and the movable range of the resisting force change mechanism. Because of this, in a vehicle including a body frame that can lean and two front wheels, the construction around the periphery of the steering shaft tends to be large.

SUMMARY OF THE INVENTION

Preferred embodiments of the present invention provide a vehicle including a body frame capable of leaning and two front wheels that prevents enlargement of a peripheral construction of a steering shaft located above the two front wheels even though a function to suppress the operation of a link mechanism is provided.

According to a preferred embodiment of the present invention, a vehicle includes a body frame; a right front wheel and a left front wheel aligned side by side in a left-and-right direction of the body frame; a right shock absorbing device that supports the right front wheel at a lower portion thereof and configured to absorb a displacement of the right front wheel in an up-and-down direction of the body frame in relation to an upper portion thereof; a left shock absorbing device that supports the left front wheel at a lower portion thereof and is configured to absorb a displacement of the left front wheel in the up-and-down direction of the body frame in relation to an upper portion thereof; a link mechanism including a right side member that supports the upper portion of the right shock absorbing device so as to turn about a right steering axis that extends in the up-and-down direction of the body frame, a left side member that supports the upper portion of the left shock absorbing device so as to turn about a left steering axis that is parallel or substantially parallel to the right steering axis, an upper cross member that supports an upper portion of the right side member at a right end portion thereof so as to turn about an upper right axis that extends in a front-and-rear direction of the body frame and supports an upper portion of the left side member at a left end portion thereof so as to turn about an upper left axis that is parallel or substantially parallel to the upper right axis and that is supported on the body frame at a middle portion thereof so as to turn about an upper middle axis that is parallel or substantially parallel to the upper right axis and the upper left axis, and a lower cross member that supports a lower portion of the right side member at a right end portion thereof so as to turn about a lower right axis that is parallel or substantially parallel to the upper right axis and supports a lower portion of the left side member at a left end portion thereof so as to turn about a lower left axis that is parallel or substantially parallel to the upper left axis and that is supported on the body frame at a middle portion thereof so as to turn about a lower middle axis that is parallel or substantially parallel to the upper middle axis; a steering shaft that is supported on the body frame between the right side member and the left side member in the left-and-right direction of the body frame, and including an upper end portion provided above the lower middle axis in the up-and-down direction of the body frame and that is able to turn about a middle steering axis that extends in the up-and-down direction of the body frame; a handlebar that is provided at the upper end portion of the steering shaft; a turn transfer mechanism configured to transfer a turning motion of the steering shaft according to an operation of the handlebar to the right shock absorbing device and to the left shock absorbing device; and a resisting force change mechanism configured to change a resisting force that is exerted against turning operations of the upper cross member and the lower cross member in relation to the body frame; wherein the resisting force change mechanism includes a first portion and a second portion configured to be displaced relatively and configured to change a resisting force exerted against the relative displacement of the first portion and the second portion, the first portion is supported on any one member of the right side member, the left side member, the upper cross member, and the lower cross member that are included in the link mechanism at a location where at least a portion thereof is superposed on the one member at all times as seen from the direction of the upper middle axis about which the upper cross member turns in relation to the body frame, and is aligned with one of a forward direction and a rearward direction of the one member and the steering shaft in relation to the direction of the upper middle axis about which the upper cross member turns in relation to the body frame; and the second portion is supported on any other member of the body frame, the right side member, the left side member, the upper cross member, and the lower cross member that are displaced relative to the one member on which the first portion is supported at a location where at least a portion thereof is superposed on the other member at all times as seen from the direction of the upper middle axis about which the upper cross member turns in relation to the body frame, and is aligned with the other member in the same direction as the one direction of the first portion relative to the one member and the steering shaft in relation to the direction of the upper middle axis about which the upper cross member turns in relation to the body frame.

According to the configuration described above, the resisting force change mechanism includes the first portion and the second portion that are displaced relative to each other and is configured to change the resisting force against the relative displacement of the first portion and the second portion.

The first portion is supported on any one of the right side member, the left side member, the upper cross member, and the lower cross member that are included in the link mechanism. The first portion is provided in the position where at least a portion thereof is superposed on the one member at all times as seen from the direction of the upper middle axis about which the upper cross member turns in relation to the body frame. The first portion is provided so as to be aligned with either of the forward direction and the rearward direction of the one member and the steering shaft in relation to the direction of the upper middle axis about which the upper cross member turns in relation to the body frame.

The second portion is supported on any other one of the body frame, the right side member, the left side member, the upper cross member, the lower cross member that are displaced relative to the one member on which the first portion is supported. The second portion is provided in the position where at least a portion thereof is superposed on the other member at all times as seen from the direction of the upper middle axis about which the upper cross member turns in relation to the body frame. The second portion is provided so as to be aligned with the other member in the same direction as the direction in which the first portion is aligned with the one member and the steering shaft in relation to the direction of the upper middle axis about which the upper cross member turns in relation to the body frame.

According to the configuration described above, the first portion is provided in the position where at least a portion thereof is superposed on the one member at all times as seen from the direction of the upper middle axis about which the upper cross member turns in relation to the body frame. The second portion is provided in the position where at least a portion thereof is superposed on the other member at all times as seen from the direction of the upper middle axis about which the upper cross member turns in relation to the body frame. Namely, a movable range of the resisting force change mechanism is situated inside a movable range of the link mechanism as seen from the direction of the upper middle axis. Because of this, even though the resisting force change mechanism is provided on the vehicle, the vehicle is not enlarged in size as seen from the direction of the upper middle axis.

In addition, according to the configuration described above, the link mechanism includes the upper cross member that supports the upper portion of the right side member at the right end portion thereof so as to turn about the upper right axis that extends in the front-and-rear direction of the body frame and supports the upper portion of the left side member at the left end portion thereof so as to turn about the upper left axis that is parallel or substantially parallel to the upper right axis and that is supported on the body frame at the middle portion thereof so as to turn about the upper middle axis that is parallel or substantially parallel to the upper right axis and the upper left axis; and the lower cross member that supports the lower portion of the right side member at the right end portion thereof so as to turn about the lower right axis that is parallel or substantially parallel to the upper right axis and supports the lower portion of the left side member at the left end portion thereof so as to turn about the lower left axis that is parallel or substantially parallel to the upper left axis and that is supported on the body frame at the middle portion thereof so as to turn about the lower middle axis that is parallel or substantially parallel to the upper middle axis. Because of this, any one of the body frame, the right side member, the left side member, the upper cross member, and the lower cross member turns about the axes that are parallel or substantially parallel to the upper middle axis and is displaced relatively on planes that are perpendicular or substantially perpendicular to the upper middle axis.

In addition, the first portion is supported on any one of the right side member, the left side member, the upper cross member, and the lower cross member that are included in the link mechanism. The second portion is supported on any other one of the body frame, the right side member, the left side member, the upper cross member, and the lower cross member that are displaced relative to the one member on which the first portion is supported. Because of this, the first portion and the second portion are displaced relative to each other on planes that are perpendicular or substantially perpendicular to the upper middle axis.

Since the direction in which the body frame, the right side member, the left side member, the upper cross member, and the lower cross member move is aligned with the direction in which the first portion and the second portion move, it is difficult for the resisting force change mechanism to interfere with the link mechanism.

Further, the first portion is provided so as to be aligned with the one direction of the forward direction and the rearward direction of the one member and the steering shaft in relation to the direction of the upper middle axis about which the upper cross member turns in relation to the body frame. The second portion is provided so as to be aligned with the other member in the same direction as the one direction in which the first portion is aligned with the one member and the steering shaft in relation to the direction of the upper middle axis about which the upper cross member turns in relation to the body frame. Since the members of the resisting force change mechanism and the members of the link mechanism both move on planes which are perpendicular or substantially perpendicular to the upper middle axis, the resisting force change mechanism and the link mechanism are disposed near to each other while being aligned with each other regarding the direction of the upper middle axis. Because of this, a movable range resulting from the combination of the movable range of the resisting force change mechanism and the movable range of the link mechanism is compact as seen from a side of the vehicle.

Thus, as has been described above, the movable ranges of the resisting force change mechanism and the link mechanism are compact as seen from the direction of the upper middle axis, and the combined movable range of the resisting force change mechanism and the link mechanism are compact as seen from the side of the vehicle. Because of this, even though the resisting force change mechanism is installed in the vehicle, the construction around the periphery of the steering shaft that is above the two front wheels is prevented from being enlarged in size. Namely, enlargement of the peripheral construction around the steering shaft above the two front wheels is significantly reduced or prevented.

The first portion is preferably supported on any one of the right side member, the left side member, the upper cross member, and the lower cross member, and the second portion is preferably supported on any other one of the right side member, the left side member, the upper cross member, and the lower cross member.

The first portion is preferably supported on any one of the right side member, the left side member, the upper cross member, and the lower cross member, and the second portion is preferably supported on the body frame.

According to the configuration described above, when the upper cross member and the lower cross member turn in relation to the body frame, any one of the right side member, the left side member, the upper cross member, and the lower cross member is displaced in relation to the body frame. Because of this, the first portion is supported on any of the right side member, the left side member, the upper cross member, and the lower cross member resulting in the advantage that the degree of freedom in design is high. This enables the first portion to be supported in the position where the interference with the other members is easily avoided, thus making it possible to prevent enlargement of the peripheral construction around the steering shaft which is above the two front wheels.

The first portion is preferably supported on the right side member in a position which is lower than the position where the right side member supports the lower cross member. Alternately, the first portion may be supported on the left side member in a position which is lower than the position where the left side member supports the lower cross member.

A space above the position where the right side member or the left side member supports the lower cross member is easily used to install other on-board components.

Then, according to the configuration described above, avoiding this space, the first portion is supported on the right side member in the position below the position where the right side member supports the lower cross member. Alternatively, the first portion is supported on the left side member in the position below the position where the left side member supports the lower cross member. Because of this, the resisting force change mechanism is easily arranged without having to take into consideration interference with the other on-board components. Thus, even though the resisting force change mechanism is provided, enlargement of the vehicle is prevented.

The resisting force change mechanism preferably includes a friction imparting portion provided on either of the first portion and the second portion, the friction imparting portion is configured to impart a frictional force to the other of the first portion and the second portion, and the resisting force change mechanism is configured to change a resisting force against the relative movement between the first portion and the second portion by adjusting the frictional force imparted by the friction imparting portion.

The resisting force change mechanism preferably includes a first fluid chamber configured to change a capacity thereof according to the relative movement between the first portion and the second portion and a second fluid chamber configured to communicate with the first fluid chamber via a communication path, and is configured to change the resisting force against the relative movement between the first portion and the second portion by restricting the movement of a fluid between the first fluid chamber and the second fluid chamber by adjusting a degree of opening of the communication path.

A distance between the first portion and the second portion preferably changes according to the turning motion of the upper cross member or the lower cross member in relation to the body frame, and the resisting force change mechanism is configured to change the resisting force according to the change in distance between the first portion and the second portion.

Turn angles of the first portion and the second portion preferably change according to the turning motion of the upper cross member or the lower cross member in relation to the body frame, and the resisting force change mechanism is configured to change the resisting force according to the change in turn angles of the first portion and the second portion.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 15A, 15B, and 15C are drawings showing a state in which a portion of a vehicle according to a third preferred embodiment of the present invention is seen from the front thereof.

FIGS. 17A and 17B are drawings showing a state in which a portion of a vehicle according to a fourth preferred embodiment of the present invention is seen from the front thereof.

DETAILED DESCRIPTION OF THE PREFERRED EMBODIMENTS

Figure 1:
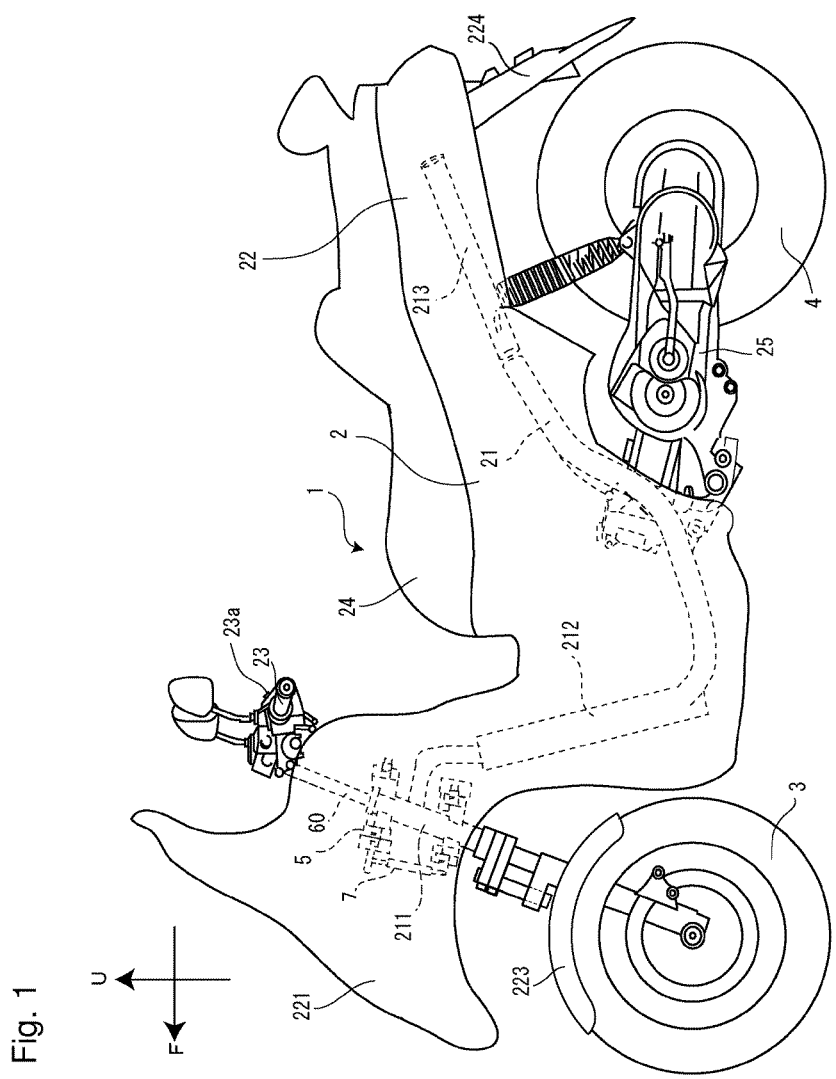
FIG. 1 is a left side view showing a three-wheeled vehicle according to a first preferred embodiment of the present invention.

Hereinafter, three-wheeled vehicles which are one type of a vehicle according to preferred embodiments of the present invention will be described by reference to the accompanying drawings.

First Preferred Embodiment

Referring to FIGS. 1 to 12, a vehicle 1 according to a first preferred embodiment of the present invention will be described. Like reference numerals will be given to like or corresponding elements, and similar descriptions thereof will not be repeated. In the following description, an arrow F in the drawings denotes a forward direction of the vehicle 1. An arrow R in the drawings denotes a rightward direction of the vehicle 1. An arrow L in the drawings denotes a leftward direction of the vehicle 1. An arrow U denotes a vertically upward direction. An outward direction in the vehicle width direction indicates a direction directed to the left or to right from a center of the vehicle width direction.

FIG. 1 is a side view of the entire vehicle 1. In the following description, when front, rear, left and right are referred to with a view to showing directions, they denote front, rear, left and right as seen from a rider on the vehicle 1.

The vehicle 1 includes a vehicle main body 2, front wheels 3, and a rear wheel 4. The vehicle main body 2 includes a body frame 21, a body cover 22, a handlebar 23, a seat 24, and a power unit 25.

The body frame 21 supports the power unit 25, the seat 24, and the like. The power unit 25 includes an engine, a transmission, and the like. In FIG. 1, the body frame 21 is shown by broken lines.

The body frame 21 includes a headpipe 211, a down frame 212, and a rear frame 213. The headpipe 211 is disposed in a front portion of the vehicle. A link mechanism 5 is disposed around the periphery of the headpipe 211. A steering shaft 60 is inserted into the headpipe 211 so as to turn therein. The steering shaft 60 extends substantially in an up-and-down direction (the direction of a middle steering axis). The handlebar 23 is provided at an upper end portion of the steering shaft 60. The down frame 212 is inclined downward from a front end thereof to the rear. The rear frame 213 supports the seat 24, a tail lamp, and the like. A switch 23a is mounted on the handle 23.

The body frame 21 is covered with the body cover 22. The body cover 22 includes a front cover 221, front fenders 223, and a rear fender 224.

The front cover 221 is arranged at the front of the seat 24. The front cover 221 covers the headpipe 211 and the link mechanism 5.

The front fenders 223 are disposed individually above a pair of left and right front wheels 3. The front fenders 223 are disposed below the front cover 221. The rear fender 224 is disposed above the rear wheel 4.

The front wheels 3 are arranged below the headpipe 211 and the link mechanism 5. The front wheels 3 are disposed directly below the front cover 221. The rear wheel 4 is disposed directly below the body cover 22.

Figure 2:
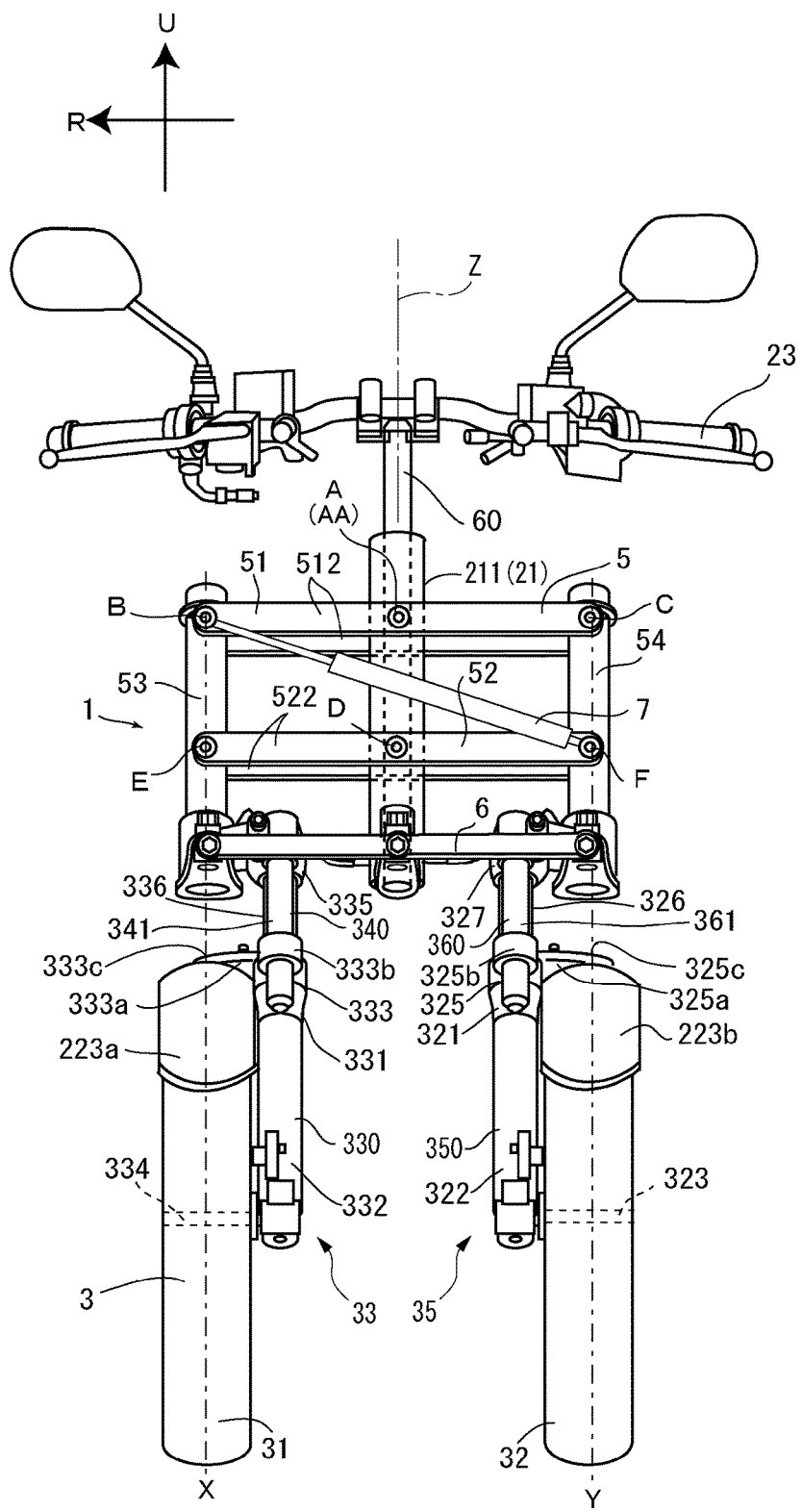
FIG. 2 is a front view showing the three-wheeled vehicle with a body cover removed.

FIG. 2 is an overall front view of the vehicle 1 with the body cover 22 removed. In FIG. 2, the down frame 212 is omitted.

The vehicle 1 includes the handlebar 23, the steering shaft 60, the headpipe 211, the pair of left and right front wheels 3, a first shock absorbing device 33, a first turn preventing mechanism 340, a second shock absorbing device 35, a second turn preventing mechanism 360, the link mechanism 5, an operation force transfer mechanism 6, and a resisting force change mechanism 7.

The front wheels 3 include a first front wheel 31 and a second front wheel 32 that are disposed side by side in a left-and-right direction of the body frame 21. The first front wheel 31, which is an example of a right front wheel, is disposed on a right side in relation to a center of the vehicle width direction. A first front fender 223a, which is one of the front fenders 223, is disposed above the first front wheel 31. The second front wheel 32, which is an example of a left front wheel, is disposed on a left side in relation to the center of the vehicle width direction. A second front fender 223b, which is the other of the front fenders 223, is disposed above the second front wheel 32. The second front wheel 32 is disposed so as to be symmetrical with the first front wheel 31 in relation to the left-and-right direction of the body frame 21. In this description, the "left-and-right direction of the body frame 21" denotes a direction which is perpendicular or substantially perpendicular to the direction of an axis of the headpipe 211 when the vehicle 1 is seen from the front thereof.

The first shock absorbing device 33, which is an example of a right shock absorbing device, supports the first front wheel 31 at a lower portion thereof and absorbs a displacement of the first front wheel 31 in an up-and-down direction of the body frame 21 in relation to an upper portion thereof. The first shock absorbing device 33 includes a first shock absorber 330 and a first turn preventing mechanism 340. In this description, the "up-and-down direction of the body frame 21" denotes a direction that follows the direction of the axis of the headpipe 211 when the vehicle 1 is seen from the front thereof.

The second shock absorbing device 35, which is an example of a left shock absorbing device, supports the second front wheel 32 at a lower portion thereof and absorbs a displacement of the second front wheel 32 in the up-and-down direction of the body frame 21 in relation to an upper portion thereof. The second shock absorbing device 35 includes a second shock absorber 350 and a second turn preventing mechanism 360.

Figure 3:
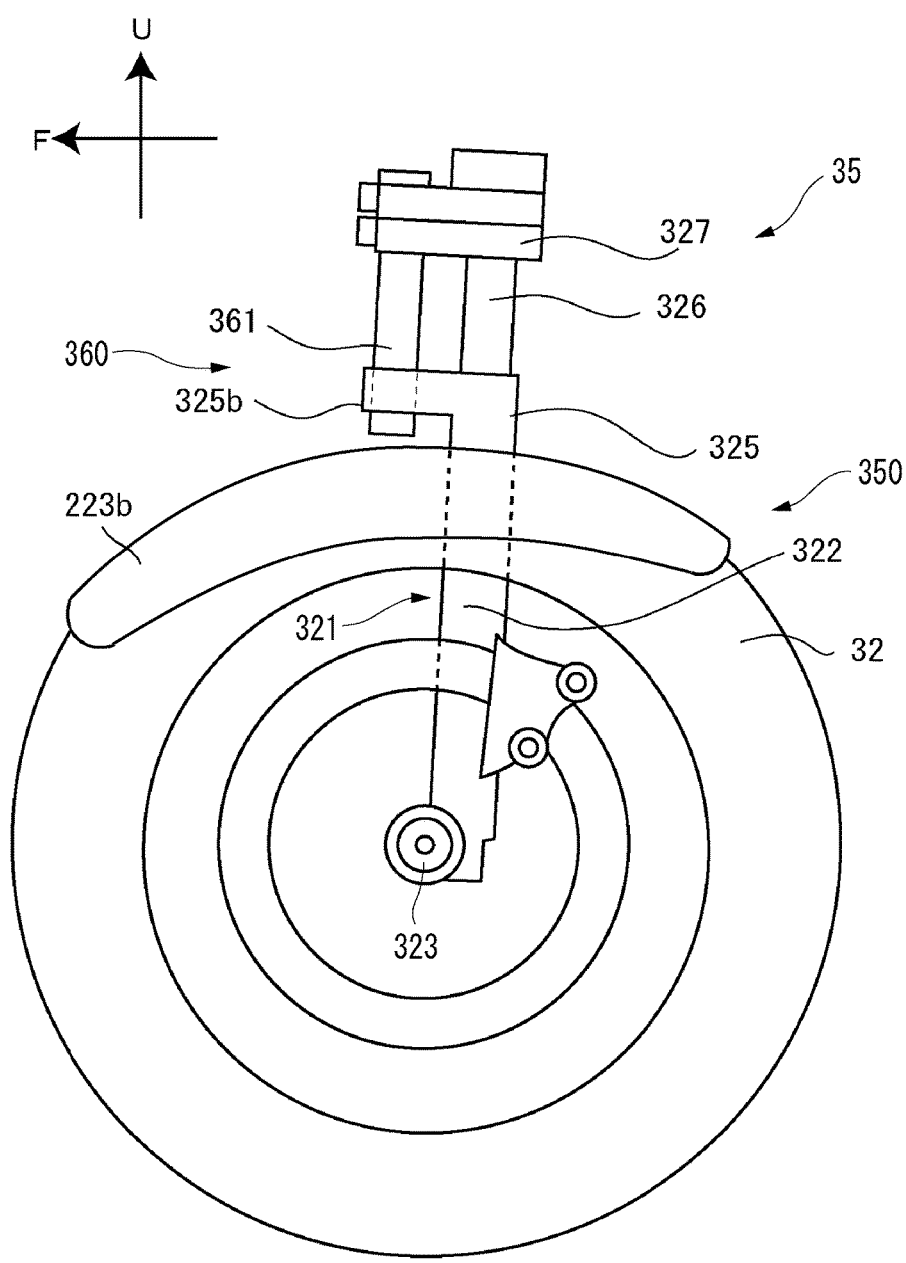
FIG. 3 is a left side view showing a relationship between a second front wheel and a second shock absorbing device in the three-wheeled vehicle in FIG. 1.

FIG. 3 is a left side view showing a relationship between the second front wheel 32 and the second shock absorbing device 35.

The second shock absorber 350 includes a second support member 321. The second support member 321 includes a second outer tube 322, a second support shaft 323, and a second inner tube 326. A portion of the second inner tube 326 is inserted in an inner circumferential side of the second outer tube 322. The second inner tube 326 is disposed directly above the second outer tube 322. The second inner tube 326 is movable relative to the second outer tube 322 in a direction in which the second outer tube 322 extends. The second shock absorber 350 is preferably a so-called telescopic shock absorber, for example.

The second turn preventing mechanism 360 prevents the turning of the second outer tube 322 in relation to the second inner tube 326. The second turn preventing mechanism 360 includes a second guide 325, a second turn preventing rod 361, and a second bracket 327. The second guide 325 guides the moving direction of the second turn preventing rod 361. The second guide 325 includes a second guide tube 325b. The second turn preventing rod 361 is inserted into an inner circumferential side of the second guide tube 325b. The second turn prevention rod 361 moves relative to the second guide tube 325b. The second turn preventing rod 361 prevents the relative turning of the second front wheel 32 to the second inner tube 326. The second turn preventing rod 361 is disposed parallel or substantially parallel to the second shock absorber 350. An upper end of the second turn preventing rod 361 and an upper end of the second inner tube 326 are fixed to the second bracket 327. This configuration prevents the relative turning of the second turn preventing rod 361 to the second inner tube 326.

As shown in FIG. 2, the second front wheel 32 is supported by the second support member 321. The second front wheel 32 is connected to a lower portion of the second support member 321. The second support shaft 323 is provided at a lower end of the second outer tube 322 and supports the second front wheel 32. The second guide 325 includes a second plate 325a. The second plate 325a extends to above the second front fender 223b. The second front wheel 32 turns about a second center axis Y to change its orientation. The second center axis Y intersects the second plate 325a at a second connection point 325c.

The first shock absorber 330 includes a first support member 331. The first support member 331 includes a first outer tube 332, a first support shaft 334, and a first inner tube 336. The first shock absorber 330 preferably has a similar configuration to that of the second shock absorber 350 that is described with reference to FIG. 3. Namely, a portion of the first inner tube 336 is inserted in an inner circumferential side of the first outer tube 332. The first inner tube 336 is disposed directly above the first outer tube 332. The first inner tube 336 moves relative to the first outer tube 332 in a direction in which the first outer tube 332 extends. The first shock absorber 330 is preferably a so-called telescopic shock absorber, for example.

The first turn preventing mechanism 340 prevents the turning of the first outer tube 332 in relation to the first inner tube 336. The first turn preventing mechanism 340 preferably has a similar configuration to that of the second turn preventing mechanism 360 that is described with reference to FIG. 3. Namely, the first turn preventing mechanism 34 includes a first guide 333, a first turn preventing rod 341, and a first bracket 335. The first guide 333 guides the moving direction of the first turn preventing rod 341. The first guide 333 includes a first guide tube 333b. A first turn preventing rod 341 is inserted into an inner circumferential side of the first guide tube 333b. The first turn preventing rod 341 moves relative to the first guide tube 333b. The first turn prevention rod 341 prevents the relative turning of the first front wheel 31 in relation to the first inner tube 336. The first turn preventing rod 341 is disposed parallel or substantially parallel to the first shock absorber 330. Upper ends of the first turn preventing rod 341 and the first inner tube 336 are fixed to the first bracket 335. This configuration prevents the relative turning of the first turn preventing rod 341 to the first inner tube 336.

The first front wheel 31 is supported on the first support member 331. The first front wheel 31 is connected to a lower portion of the first support member 331. The first support shaft 334 is provided at a lower end of the first outer tube 332 and supports the first front wheel 31. The first guide 333 includes a first plate 333a. The first plate 333a extends to above the first front fender 223a. The first front wheel 31 turns about a first center axis X to change its orientation. The first center axis X intersects the first plate 333a at a first connection point 333c.

The link mechanism 5 is disposed below the handlebar 23. The link mechanism 5 is disposed above the first front wheel 31 and the second front wheel 32. The link mechanism 5 is connected to the headpipe 211. The link mechanism 5 includes a first cross member 51 (an example of an upper cross member), a second cross member 52 (an example of a lower cross member), a first side member 53 (an example of a right side member), and a second side member 54 (an example of a left side member).

Figure 4:
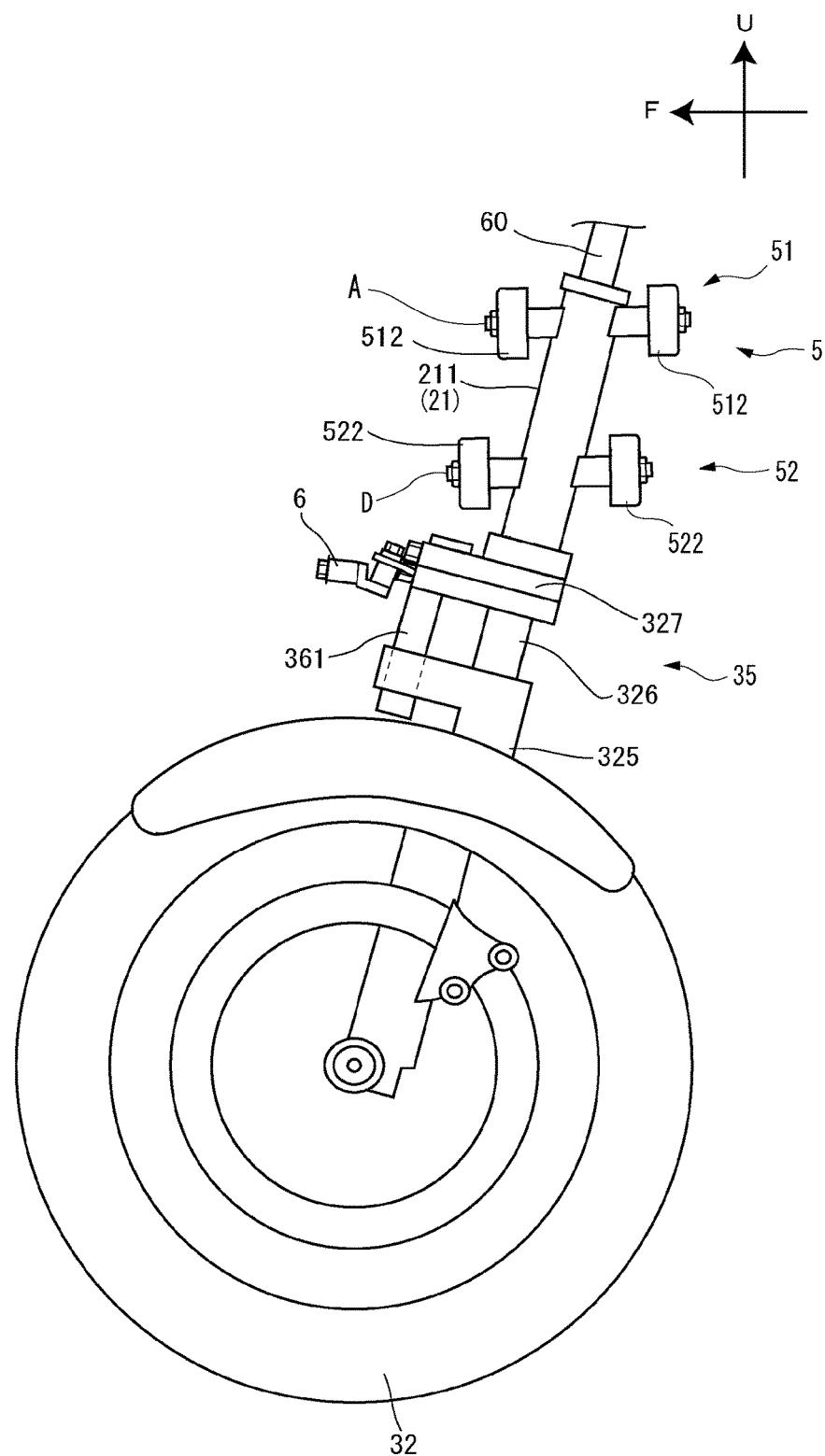
FIG. 4 is a left side view showing a portion of the three-wheeled vehicle in FIG. 1.

As shown in FIG. 4, the first cross member 51 includes a pair of plate-shaped members 512. The first cross member 51 extends in the left-and-right direction of the body frame 21. The pair of plate-shaped members 512 sandwiches the headpipe 211 therebetween in the front-and-rear direction of the body frame 21. In this description, the "front-and-rear direction of the body frame 21" denotes a direction which coincides with a front-and-rear direction of the vehicle 1. In this description, when an element is described as "extending in the left-and-right direction of the body frame 21," this includes a direction in which the element extends while being inclined in the left-and-right direction of the body frame 21 and in which the element extends substantially in the left-and-right direction of the body frame 21 rather than in the up-and-down direction and front-and-rear direction of the body frame 21.

As shown in FIG. 2, a middle portion of the first cross member 51 is supported on the body frame 21 (the headpipe 211) by a support portion A. The middle portion of the first cross member 51 is supported on the body frame 21 at the support portion A so as to turn about an upper middle axis AA that extends in the front-and-rear direction of the body frame 21. Even though the steering shaft 60 turns as the handlebar 23 is turned, the first cross member 51 does not turn about a turning axis of the steering shaft 60. In this description, when an element is described as "extending in the front-and-rear direction of the body frame 21," this includes a direction in which the element extends while being inclined in the front-and-rear direction of the body frame 21 and in which the element extends substantially in the front-and-rear direction of the body frame 21 rather than in the up-and-down direction and left-and-right direction of the body frame 21.

As shown in FIG. 2, a right end portion of the first cross member 51 is connected to an upper portion of the first side member 53 by a connecting portion B. An upper portion of the first side member 53 is supported so as to turn about an upper right axis that extends in the front-and-rear direction of the body frame 21 at the connecting portion B by the right end portion of the first cross member 51. A left end portion of the first cross member 51 is connected to an upper portion of the second side member 54 by a connecting portion C. An upper portion of the second side member 54 is supported so as to turn about an upper left axis that extends in the front-and-rear direction of the body frame 21 at the connecting portion C by the left end portion of the first cross member 51. The upper middle axis AA, upper right axis, and upper left axis are parallel or substantially parallel to each other.

As shown in FIG. 4, the second cross member 52 includes a pair of plate-shaped members 522. The second cross member 52 extends in the left-and-right direction of the body frame 21. The pair of plate-shaped members 522 sandwiches the headpipe 211 therebetween in the front-and-rear direction of the body frame 21. In an upright state of the body frame 21, the second cross member 52 is disposed below the first cross member 51 and above the first shock absorbing device 33 and the second shock absorbing device 35.

A middle portion of the second cross member 52 is supported on the body frame 21 (the headpipe 211) by a support portion D. The middle portion of the second cross member 52 is supported on the body frame 21 at the support portion D so as to turn about a lower middle axis that extends in the front-and-rear direction of the body frame 21. A turning axis that extends in the front-and-rear direction of the body frame 21 at the support portion D is parallel or substantially parallel to a turning axis that extends in the front-and-rear direction of the body frame 21 at the support portion A. Even though the steering shaft 60 turns as the handlebar 23 is turned, the second cross member 52 does not turn about the turning axis of the steering shaft 60.

As shown in FIG. 2, a right end portion of the second cross member 52 is connected to a lower portion of the first side member 53 by a connecting portion E. The lower portion of the first side member 53 is supported so as to turn about a lower right axis that extends in the front-and-rear direction of the body frame 21 at the connecting portion E by the right end portion of the second cross member 52. A left end portion of the second cross member 52 is connected to a lower portion of the second side member 54 at a connecting portion F. The lower portion of the second side member 54 is supported so as to turn about a lower left axis that extends in the front-and-rear direction of the body frame 21 at the connecting portion F by the left end portion of the second cross member 52.

The upper middle axis AA, upper right axis, upper left axis, lower middle axis, lower right axis, and lower left axis are parallel or substantially parallel to each other.

In this description, the first cross member 51 and the second cross member 52 each include the pair of front and rear plate-shaped members that extend in the left-and-right direction. However, the first cross member 51 and the second cross member 52 preferably each include a member that extends rightward from the headpipe 211 and a member that extends leftward from the headpipe 211.

The first side member 53 is disposed directly to the right of the headpipe 211. The first side member 53 extends in a direction that is parallel or substantially parallel to a direction in which the headpipe 211 and the steering shaft 60 extend. The first side member 53 is disposed directly above the first front wheel 31 and the first shock absorbing device 33. The first side member 53 supports an upper portion of the first shock absorbing device 33 so as to turn about a first center axis X (an example of a right axis).

The second side member 54 is disposed directly to the left of the headpipe 211. The second side member 54 extends in a direction that is parallel or substantially parallel to the direction in which the headpipe 211 and the steering shaft 60 extend. The second side member 54 is disposed directly above the second front wheel 32 and the second shock absorbing device 35. The second side member 54 supports an upper portion of the second shock absorbing device 35 so as to turn about a second center axis Y (an example of a left axis).

The steering shaft 60 is supported on the body frame 21 between the first side member 53 and the second side member 54 in the left-and-right direction of the body frame 21. An upper end portion of the steering shaft 60 is provided above the turning axis at the support portion D of the second cross member 52 in the up-and-down direction of the body frame 21. The steering shaft 60 turns about a middle steering axis Z that extends in the up-and-down direction of the body frame 21 (the headpipe 211). In this description, when an element is described as "extending in the up-and-down direction of the body frame 21," this includes a direction in which the element extends while being inclined in the up-and-down direction of the body frame 21 and in which the element extends substantially in the up-and-down direction of the body frame 21 rather than in the front-and-rear direction and left-and-right direction of the body frame 21.

Figure 5:
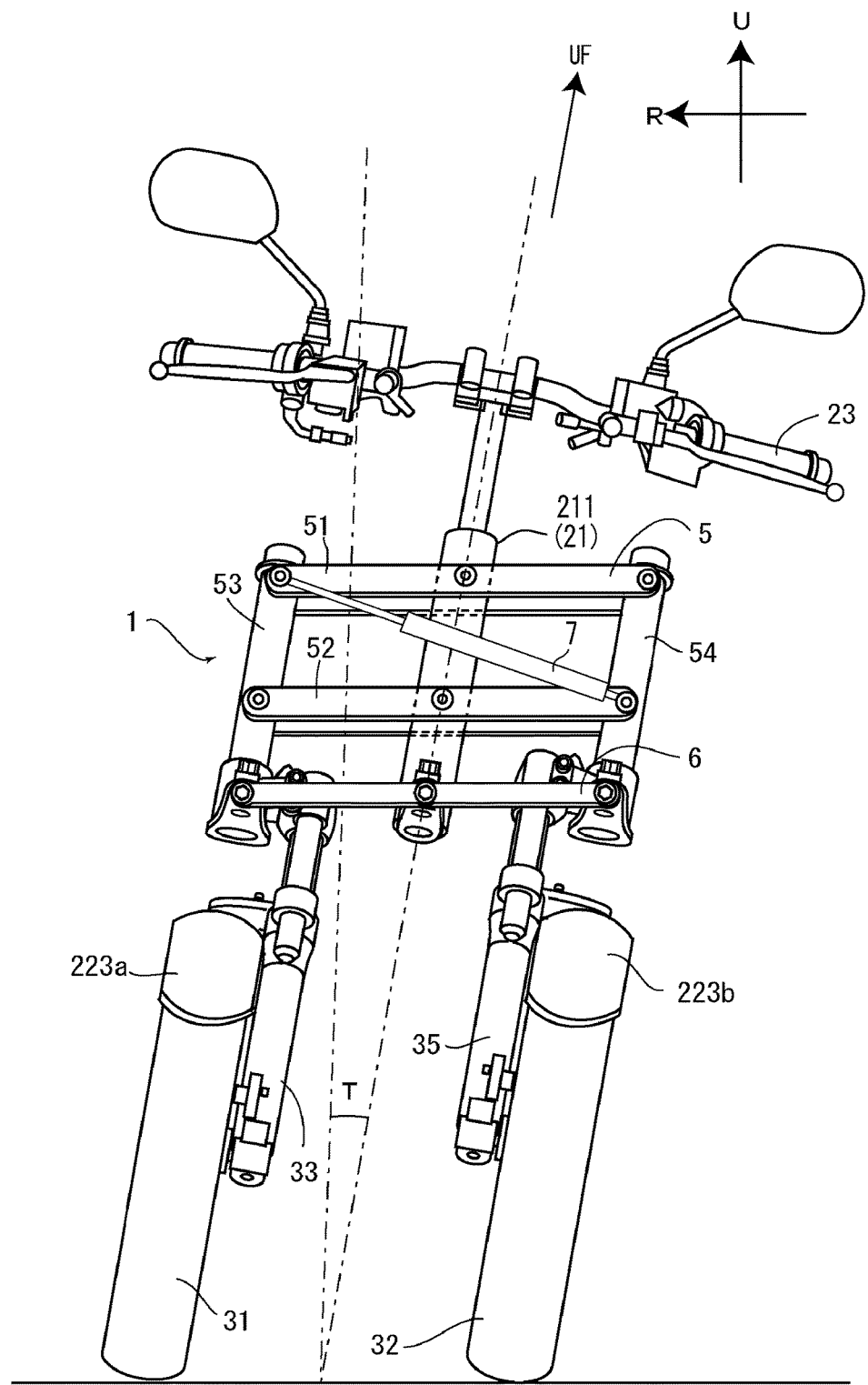
FIG. 5 is a front view of the three-wheeled vehicle shown in FIG. 1 showing the vehicle leaning.

FIG. 5 is a front view showing a state in which the body frame 21 leans leftward by an angle T. An upward direction of the body frame 21 is indicated by an arrow UF. In the upright state of the vehicle 1, the upward direction UF of the body frame 21 coincides with a vertically upward direction U. In the leaning state of the vehicle 1, the upward direction UF of the body frame 21 does not coincide with the vertically upward direction U.

When the body frame 21 leans leftward or rightward, the link mechanism 5 is deformed. When the rider attempts to cause the vehicle 1 to lean leftward by the angle T, the body frame 21 (the headpipe 211) leans leftward from the upright state thereof. As the body frame 21 leans, the first cross member 51 and the second cross member 52 turn in relation to the headpipe 211, the first side member 53, and the second side member 54. As this occurs, the direction in which the first cross member 51 extends and the direction in which the second cross member 52 extends are parallel or substantially parallel when the vehicle 1 is seen from the front. As the headpipe 211 leans leftward, the left end portion of the first cross member 51 moves farther leftward than the left end portion of the second cross member 52. This causes the second side member 54 to lean leftward from the upright state. As this occurs, the direction in which the second side member 54 extends is parallel or substantially parallel to the direction in which the headpipe 211 extends when the vehicle is seen from the front thereof. As with the second side member 54, the first side member 53 also leans leftward from the upright state. The direction in which the first side member 53 extends is parallel or substantially parallel to the direction in which the headpipe 211 extends when the vehicle 1 is seen from the front thereof. As the link mechanism 5 is deformed as described above, the first front wheel 31 is displaced farther upwards (to the upward direction UF) of the body frame 21 than the second front wheel 32, such that the vehicle 1 is permitted to lean leftward.

Similarly, when the rider attempts to cause the vehicle 1 to lean rightward, the body frame 21 (the headpipe 211) leans rightward from the upright state. As the body frame 21 leans, the first cross member 51 and the second cross member 52 turn in relation to the headpipe 211, the first side member 53, and the second side member 54. As this occurs, the direction in which the first cross member 51 extends and the direction in which the second cross member 52 extends are parallel or substantially parallel when the vehicle 1 is seen from the front. As the headpipe 211 leans rightward, the left end portion of the first cross member 51 moves farther rightward than the left end portion of the second cross member 52. This causes the second side member 54 to lean rightward from the upright state. As this occurs, the direction in which the second side member 54 extends is parallel or substantially parallel to the direction in which the headpipe 211 extends when the vehicle is seen from the front thereof. As the second side member 54 does, the first side member 53 also leans rightward from the upright state. The direction in which the first side member 53 extends is parallel or substantially parallel to the direction in which the headpipe 211 extends when the vehicle 1 is seen from the front thereof. As the link mechanism 5 is deformed as described above, the second front wheel 32 is displaced further upwards (to the upward direction UF) of the body frame 21 than the first front wheel 31, such that the vehicle 1 is permitted to lean rightward.

The operation force transfer mechanism 6, which is an example of a turn transfer mechanism, transfers a turning motion of the steering shaft 60 according to an operation of the handlebar 23 to the first shock absorbing device 33 and the second shock absorbing device 35 so as to turn the first shock absorbing device 33 and the second shock absorbing device 35 about the first center axis X and the second center axis Y, respectively. A portion of the operation force transfer mechanism 6 is disposed below the second cross member 52. The operation force transfer mechanism 6 is disposed above the first front wheel 31 and the second front wheel 32.

As shown in FIG. 2, a lower end portion of the first side member 53 is connected to the first bracket 335. The first bracket 335 is attached to the first side member 53 so as to turn about the first center axis X. The operation force transfer mechanism 6 connects the lower end portion of the steering shaft 60 and the first bracket 335 together. The operation force transfer mechanism 6 transfers a turning motion of the steering shaft 60 which is triggered by turning of the handlebar 23 to the first bracket 335. This causes the first bracket 335 to turn about the first center axis X in relation of the first side member 53. The first side member 53 does not turn in relation to the body frame 21, even though the handlebar 23 is turned.

A lower end portion of the second side member 54 is connected to the second bracket 327. The second bracket 327 is attached to the second side member 54 so as to turn about the second center axis Y in relation to the second side member 54. The operation force transfer mechanism 6 connects the lower end portion of the steering shaft 60 and the second bracket 327. The operation force transfer mechanism 6 transfers a turning motion of the steering shaft 60 which is triggered by turning of the handlebar 23 to the second bracket 327. This causes the second bracket 327 to turn about the second center axis Y in relation to the second side member 54. The second side member 54 does not turn in relation to the body frame 21, even though the handlebar 23 is turned.

Figure 6:
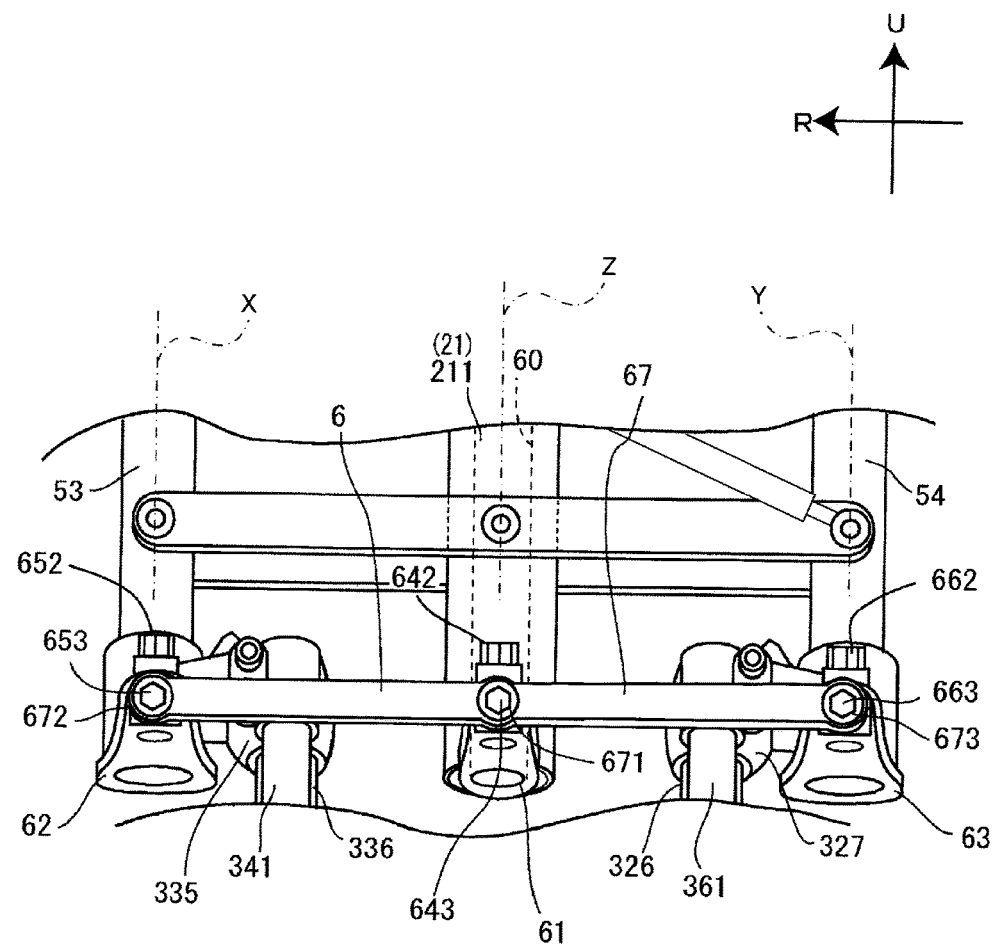
FIG. 6 is an enlarged front view showing an operation force transfer mechanism of the three-wheeled vehicle in FIG. 1.

FIG. 6 is a front view showing the operation force transfer mechanism 6 in an enlarged manner. The operation force transfer mechanism 6 includes the steering shaft 60, a first transfer plate 61, a second transfer plate 62, a third transfer plate 63, a first transfer member 67, the first bracket 335, and the second bracket 327.

The first transfer plate 61 is connected to the lower end portion of the steering shaft 60. The first transfer plate 61 cannot turn in relation to the steering shaft 60. When the handlebar 23 is turned in relation to the headpipe 211, the steering shaft 60 turns in relation to the headpipe 211. The first transfer plate 61 turns as the steering shaft 60 turns.

The second transfer plate 62 is fixed to the first bracket 335 of the first shock absorbing device 33 and is allowed to turn together with the first bracket 335 in relation to the first side member 53. The second transfer plate 62 is situated below the first bracket 335.

The third transfer plate 63 is disposed symmetrical with the second transfer plate 62 with respect to the first transfer plate 61. The third transfer plate 63 is fixed to the second bracket 327 of the second shock absorbing device 35 and is allowed to turn together with the second bracket 327 in relation to the second side member 54. The third transfer plate 63 is situated below the second bracket 327.

In this description, a portion which is fixed to the first shock absorbing device 33 and which turns together with the first shock absorbing device 33 is understood to define a portion of the first shock absorbing device 33. Consequently, the second transfer plate 62 of the operation force transfer mechanism 6 also defines a portion of the first shock absorbing device 33. Similarly, a portion which is fixed to the second shock absorbing device 35 and which turns together with the second shock absorbing device 35 is understood to define a portion of the second shock absorbing device 35. Consequently, the third transfer plate 63 of the operation force transfer mechanism 6 also defines a portion of the second shock absorbing device 35.

The first transfer member 67 transfers an operation force that is transferred from the steering shaft 60 to the first bracket 335 and the second bracket 327. The first transfer member 67 extends in the left-and-right direction of the body frame 21. A configuration to enable the operation force to be transferred from the steering shaft 60 to the first bracket 335 and the second bracket 327 will be described in detail below.

Figure 7:
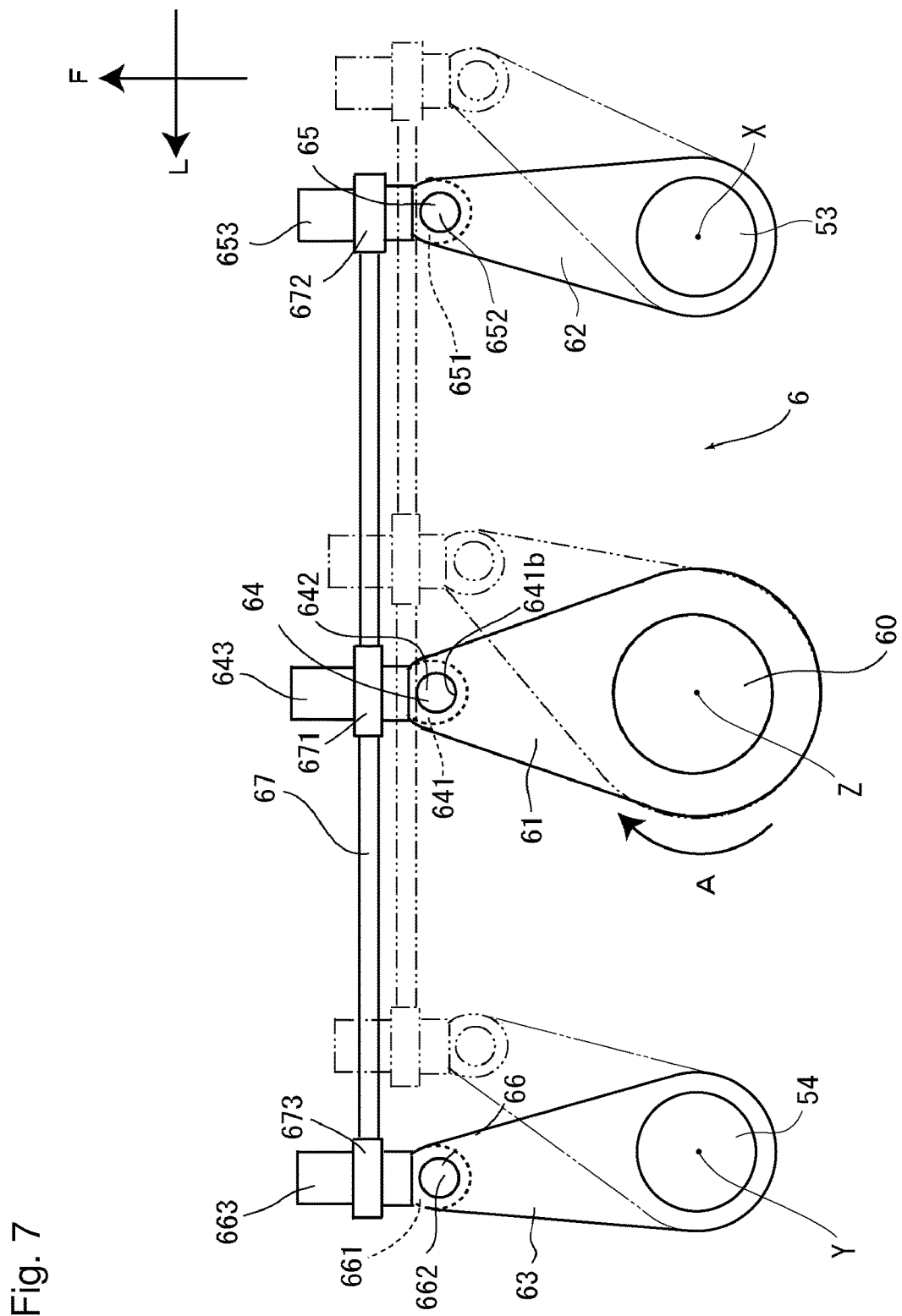
FIG. 7 is a drawing showing schematically the operation of the operation force transfer mechanism in FIG. 6.

FIG. 7 is a schematic plan view showing the configuration of the operation force transfer mechanism 6. In FIG. 7, the operation force transfer mechanism 6 is viewed from above with the configurations of the link mechanism 5, the brackets and the like all omitted. Two-dot chain lines in FIG. 7 indicate a state in which the steering shaft 60 is turned in a direction indicated by an arrow A.

The operation force transfer mechanism 6 includes a first joint 64, a second joint 65, and a third joint 66.

The first transfer plate 61 is narrower in width at a front portion than at a rear portion of the first transfer plate 61. The first joint 64 is disposed at the front portion of the first transfer plate 61.

The second transfer plate 62 is narrower in width at a front portion than at a rear portion of the second transfer plate 62. The second joint 65 is disposed at the front portion of the second transfer plate 62. The second transfer plate 62 is disposed on the right of the first transfer plate 61.

The third transfer plate 63 is narrower in width at a front portion than at a rear portion of the third transfer plate 63. The third joint 66 is disposed at the front portion of the third transfer plate 63. The third transfer plate 63 is disposed directly to the left of the first transfer plate 61.

The first joint 64 includes a first bearing 641, a first shaft 642, and a first front rod 643. The first shaft 642 turns relative to the first bearing 641. The first bearing 641 supports the first shaft 642. The first bearing 641 is supported on the first transfer plate 61. The first transfer plate 61 includes a first support hole 641b that supports the first shaft 642. The first shaft 642 is fitted in the first support hole 641b. The first bearing 641 is fixed to the first shaft 642. The first shaft 642 is disposed at a front end of the first transfer plate 61.

The first front rod 643 extends forward from the first bearing 641. The first front rod 643 turns relatively leftward or rightward about the first shaft 642 as a result of the first bearing 641 turning in relation to the first transfer plate 61. The first front rod 643 is fixed to the first bearing 641.

The second joint 65 includes a second bearing 651, a second shaft 652, and a second front rod 653. The second bearing 651 preferably has a configuration similar to that of the first bearing 641. The second shaft 652 preferably has a configuration similar to that of the first shaft 642. The second front rod 653 preferably has a configuration similar to that of the first front rod 643.

The third joint 66 includes a third bearing 661, a third shaft 662, and a third front rod 663. The third bearing 661 preferably has a configuration similar to that of the first bearing 641. The third shaft 662 preferably has a configuration similar to that of the first shaft 642. The third front rod 663 preferably has a configuration similar to that of the first front rod 643.

The first transfer member 67 includes a first ring 671, a second ring 672, and a third ring 673. The first front rod 643 is inserted through the first ring 671. The first ring 671 is provided at a center in a left-and-right direction of the first transfer member 67. The second ring 672 is disposed on the right of the first ring 671. The second front rod 653 is inserted into the second ring 672. The third ring 673 is disposed on the left of the first ring 671. The third front rod 663 is inserted into the third ring 673.

Figure 8:
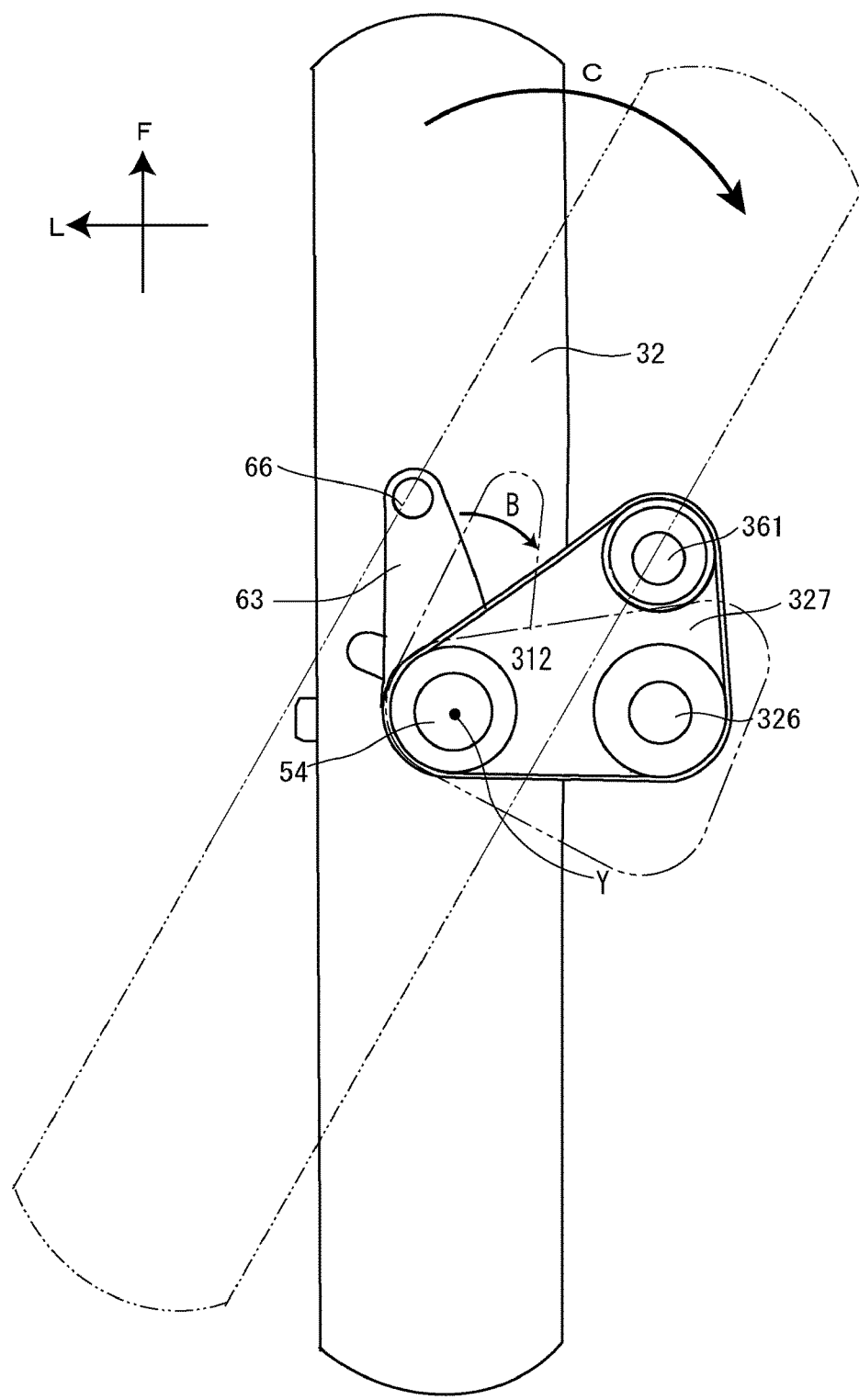
FIG. 8 is a drawing showing schematically the operation of a second bracket and a second front wheel of the three-wheeled vehicle in FIG. 1.

FIG. 8 is a plan view showing the second front wheel 32 and the second bracket 327. Two-dot chain lines in FIG. 8 indicate a state in which the second front wheel 32 is turned. The second front fender 223b is omitted from the illustration.

The second bracket 327 is connected to the second side member 54 as has been described above. The third transfer plate 63 is mounted on the second bracket 327.

When the steering shaft 60 is turned, the first transfer plate 61 turns as the steering shaft 60 turns. Here, for example, when the steering shaft 60 is turned in a direction indicated by an arrow A in FIG. 7, the first joint 64 moves rightward and rearward as the first transfer plate 61 turns. As this occurs, the first shaft 642 rotates in relation to the first bearing 641 to move the first transfer member 67 rightward and rearward while maintaining the posture of the first transfer member 67. The second front rod 653 and the third front rod 663 move rightward and rearward as the first transfer member 67 moves rightward. When the second front rod 653 and the third front rod 663 move rightward and rearward, the second bearing 651 and the third bearing 661 move rightward and rearward. As the second bearing 651 and the third bearing 661 move rightward and rearward, the second transfer plate 62 and the third transfer plate 63 turn in the direction indicated by the arrow A about the first side member 53 and the second side member 54, respectively. This creates the state indicated by the two-dot chain lines in FIG. 7. A turning center of the second transfer plate 62 coincides with the first center axis X. A turning center of the third transfer plate 63 coincides with the second center axis Y.

When the third transfer plate 63 turns about the third side member 54, the second bracket 327 turns in a direction indicated by an arrow B in FIG. 8 via a third transfer member 69. When the second bracket 327 turns in the direction indicated by the arrow B, the second front wheel 32 turns in a direction indicated by an arrow C in FIG. 8 via the second shock absorber 350. The front wheel 32 turns rightward about the second center axis Y. As this occurs, the front wheel 32 takes a position indicated by two-dot chain lines in FIG. 8. As the second front wheel 32 does, the first front wheel 31 turns rightward about the first center axis X. In this manner, the first front wheel 31 and the second front wheel 32 turn in the left-and-right direction of the body frame 21 by turning the handlebar 23 in the left-and-right direction of the body frame 21.

Next, referring to FIGS. 9A to 12B, the resisting force change mechanism 7 will be described. The resisting force change mechanism 7 suppresses the deformation of the link mechanism 5. Specifically, the resisting force change mechanism 7 is configured to change a resisting force that is imparted to the first cross member 51 and the second cross member 52 which are turning in relation to the body frame 21.

Figure 9A:
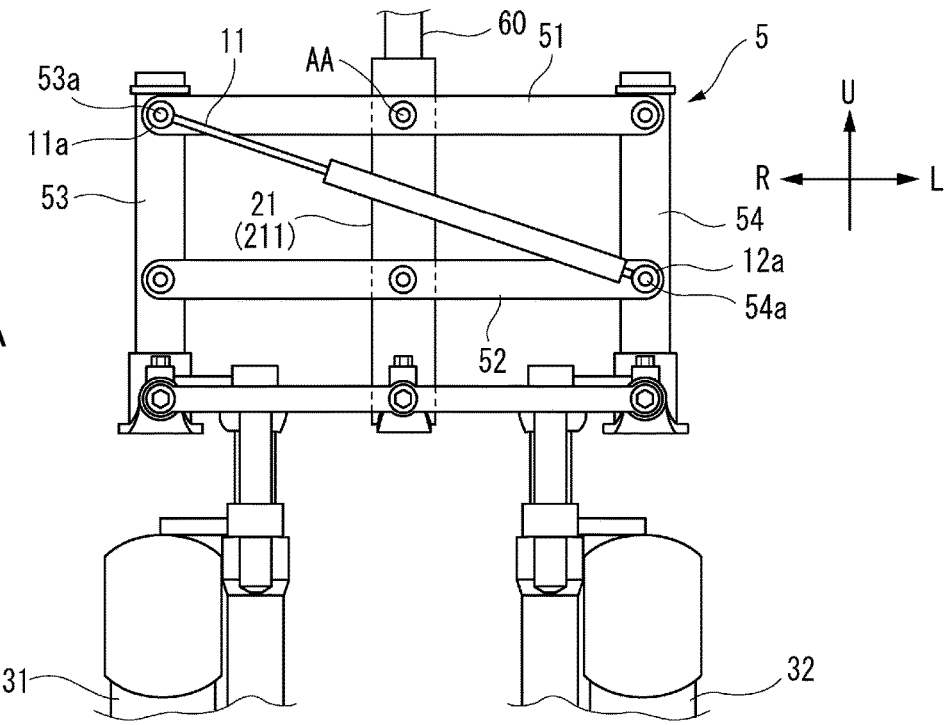
FIGS. 9A and 9B are drawings showing a resisting force change mechanism of the three-wheeled vehicle in FIG. 1.
Figure 9B:
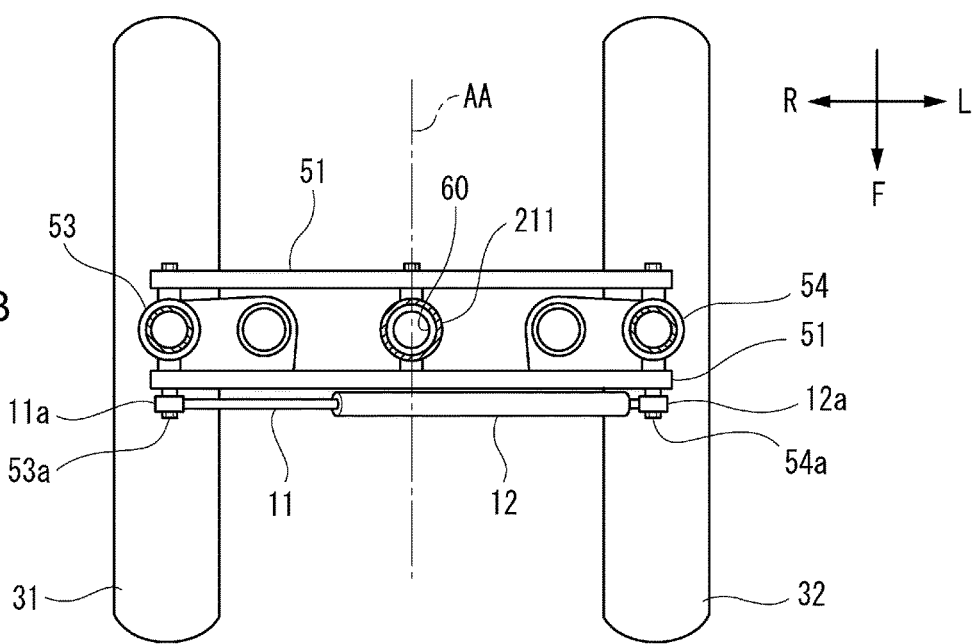

FIGS. 9A and 9B are drawings that illustrate the resisting force change mechanism 7. In FIGS. 9A and 9B, the body cover 22 and the like are omitted. FIG. 9A is a front view showing a portion of the vehicle 1 in which the resisting force change mechanism 7 is installed. FIG. 9A shows a view resulting when a portion of the vehicle 1 is seen from the front in the direction of the upper middle axis AA. FIG. 9B shows a view resulting when FIG. 9B is seen from the top of the body frame 21.

The resisting force change mechanism 7 is preferably a so-called telescopic element, for example. A construction that is similar to this telescopic element is disclosed in German Unexamined Patent Publication No. DE 102010052716A1 and the like.

As shown in FIGS. 9A and 9B, the resisting force change mechanism 7 includes an inner rod 11 (an example of a first portion) and an outer rod 12 (an example of a second portion). The inner rod 11 is an elongated member. The outer rod 12 is an elongated member. One end portion of the inner rod 11 is inserted into a hole opened at one end portion of the outer rod 12. An insertion length of the inner rod 11 into the outer rod 12 can be changed.

An inner support portion 11a is provided at the other end portion of the inner rod 11. The inner support portion 11a is attached to an upper right shaft portion 53a of the first side member 53 so as to turn thereabout. The upper right shaft portion 53a is a shaft portion that passes along an upper right axis to project forward from the first side member 53 in the direction of the upper right axis.

An outer support portion 12a is provided at the other end portion of the outer rod 12. The outer support portion 12a is attached to a lower left shaft portion 54a of the second side member 54 so as to turn thereabout. The lower left shaft portion 54a is a shaft portion that passes along a lower left axis to project forward from the second side member 54 in the direction of the lower left axis.

The resisting force change mechanism 7 is configured to displace the inner support portion 11a and the outer support portion 12a relative to each other by changing the insertion length of the inner rod 11 into the outer rod 12.

In the resisting force change mechanism 7 according to the present preferred embodiment, the inner support portion 11a is supported at the upper right shaft portion 53a of the first side member 53. Because of this, as shown in FIG. 9A, as seen from the front in the direction of the upper middle axis AA, a portion of the inner rod 11 which includes the inner support portion 11a is provided in a position where it is superposed on the first side member 53 at all times.

Similarly, the outer support portion 12a is supported at the lower left shaft portion 54a of the second side member 54. Because of this, as shown in FIG. 9A, as seen from the front in the direction of the upper middle axis AA, a portion of the outer rod 12 which includes the outer support portion 12a is provided in a position where it is superposed on the second side member 54 at all times.

Figure 10B:
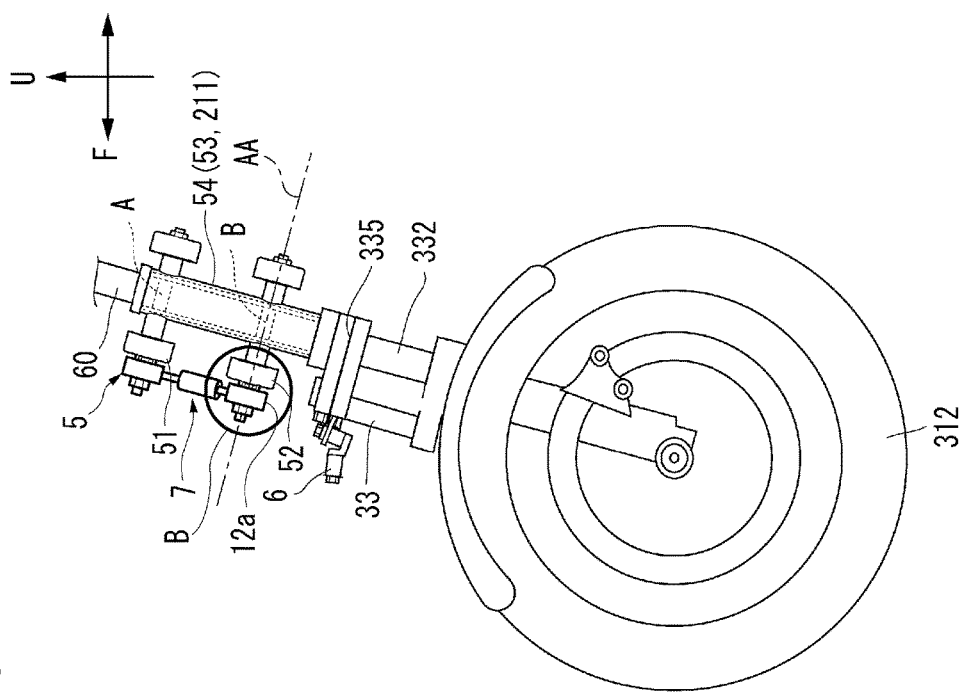
FIGS. 10A and 10B are side views of the resisting force change mechanism shown in FIGS. 9A and 9B.
Figure 10A:
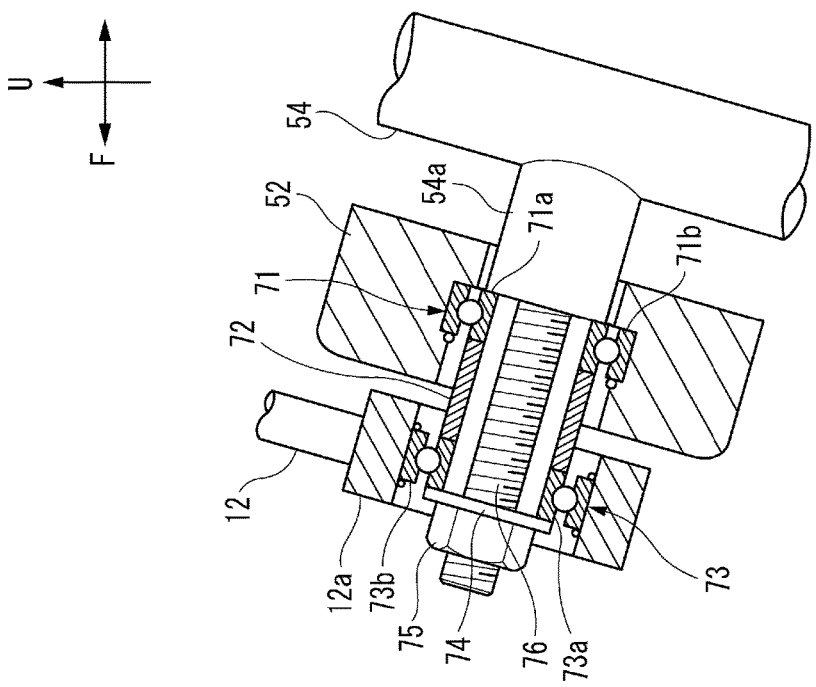

Next, referring to FIGS. 10A and 10B, an attaching construction of the outer rod 12 will be described. FIG. 10A is a side view of the portion of the vehicle 1 shown in FIGS. 9A and 9B as seen from a left-hand side thereof. FIG. 10B is an enlarged view of portion B of FIG. 10A with the second cross member 52 and the outer support portion 12a shown in section.

As shown in FIG. 10B, the lower left shaft portion 54a extends forward from the second side member 54 in the front-and-rear direction of the body frame 21. A first bearing 71 is provided between the lower left shaft portion 54a and the second cross member 52. An inner ring 71a of the first bearing 71 is fixed to the lower left shaft portion 54a. An outer ring 71b of the first bearing 71 is fixed to the second cross member 52. The second side member 54 supports the second cross member 52 so as to rotate via the first bearing 71.

A cylindrical collar 72 is provided in front of the inner ring 71a of the first bearing 71. An inner ring 73a of a second bearing 73 is provided in front of the collar 72.

A washer 74 is provided in front of the inner ring 73a of the second bearing 73. A nut 75 is provided in front of the washer 74. The nut 75 is fastened to a bolt 76 which extends through the second cross member 52 and the second side member 54. The inner ring 73a of the second bearing 73, the collar 72, the inner ring 71a of the first bearing 71, and the lower left shaft portion 54a are not allowed to rotate relative to each other by fastening the nut 75 onto the bolt 76. Namely, by the nut 75 and the bolt 76 being fastened together, the inner ring 71a of the first bearing 71, the collar 72, the inner ring 73a of the second bearing 73, and the lower left shaft portion 54a are made integral with each other.

An outer ring 73b of the second bearing 73 is fixed to the outer support portion 12a. The outer support portion 12a is supported on the lower left shaft portion 54a via the second bearing 73 so as to rotate thereon. The inner ring 73a of the second bearing 73 is made integral with the lower left shaft portion 54a.

As shown in FIG. 10A, the outer support portion 12a is disposed in front of the steering shaft 60 and in front of the second side member 54 in relation to the direction of the upper middle axis AA. In addition, the outer support portion 12a is disposed in front of the second side member 54 and aligned with the second side member 54 regarding the direction of the upper middle axis AA.

An attaching construction of the inner support portion 11a to the first side member 53 is preferably similar to the attaching construction of the outer support portion 12a to the second side member 54, and therefore, the description thereof will be omitted here.

Next, referring to FIG. 11, a construction will be described in which the resisting force change mechanism 7 changes a resisting force against the relative displacement between the inner rod 11 and the outer rod 12.

Figure 11:
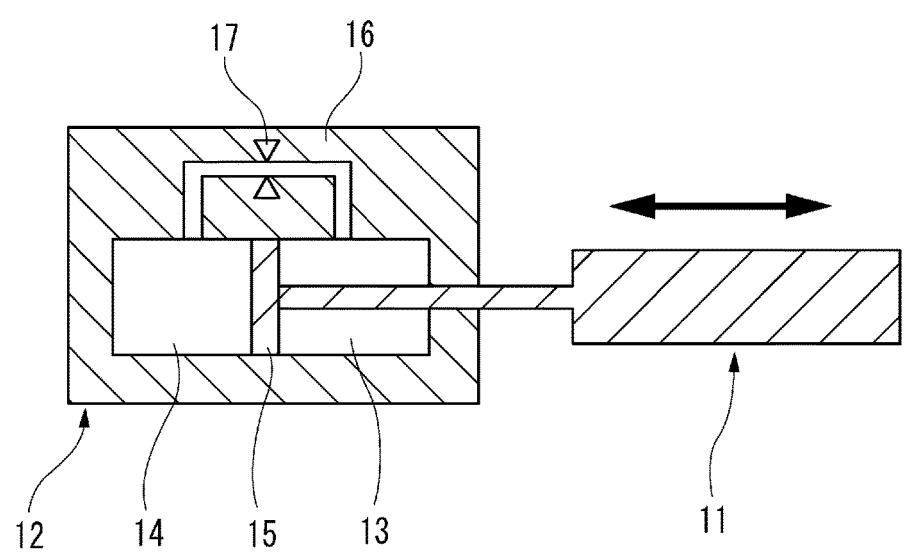
FIG. 11 is a schematic drawing that describes the operation of the resisting force change mechanism shown in FIGS. 9A and 9B.

FIG. 11 is a schematic drawing that describes the operation of the resisting force change mechanism 7. As shown in FIG. 11, a fluid chamber that is filled with a fluid is provided in an interior of the outer rod 12. This fluid chamber is divided into a first fluid chamber 13 and a second fluid chamber 14 by a bulkhead 15 that moves in a longitudinal direction of the outer rod 12. The bulkhead 15 is in contact with an inner wall of the fluid chamber in a fluid-tight fashion.

The first fluid chamber 13 and the second fluid chamber 14 are connected together via a communication path 16. A valve 17 is provided along the length of the communication path 16. A resisting force is imparted to a fluid that flows in the communication path 16 by controlling the opening of the valve 17. The opening of the valve 17 is controlled by operating a controller. The controller is preferably a control lever or control button, or a control switch, for example. The controller is preferably provided on the handlebar 23, for example.

The bulkhead 15 is connected to the inner rod 11. With the valve 17 opened, when the inner rod 11 is caused to move in the longitudinal direction, the fluid flows through the communication path 16, such that the capacity of the first fluid chamber 13 and the capacity of the second fluid chamber 14 change. When the inner rod 11 is caused to move in the longitudinal direction so as to move away from the outer rod 12, the capacity of the first fluid chamber 13 is decreased, while the capacity of the second fluid chamber 14 is increased. When the inner rod 11 is caused to move in the longitudinal direction so as to move towards the outer rod 12, the capacity of the first fluid chamber 13 is increased, while the capacity of the second fluid chamber 14 is decreased.

When the valve 17 is closed completely, the fluid is not allowed to flow between the first fluid chamber 13 and the second fluid chamber 14. Because of this, the capacities of the first fluid chamber 13 and the second fluid chamber 14 cannot be changed, and the inner rod 11 that is connected to the bulkhead 15 is not allowed to move relative to the outer rod 12.

A force that is required to move the inner rod 11 relative to the outer rod 12 is changed by controlling the opening of the valve 17. Namely, in the present preferred embodiment, the resisting force against the relative displacement between the inner rod 11 and the outer rod 12 is changed by controlling the opening of the valve 17.

Figure 12A:
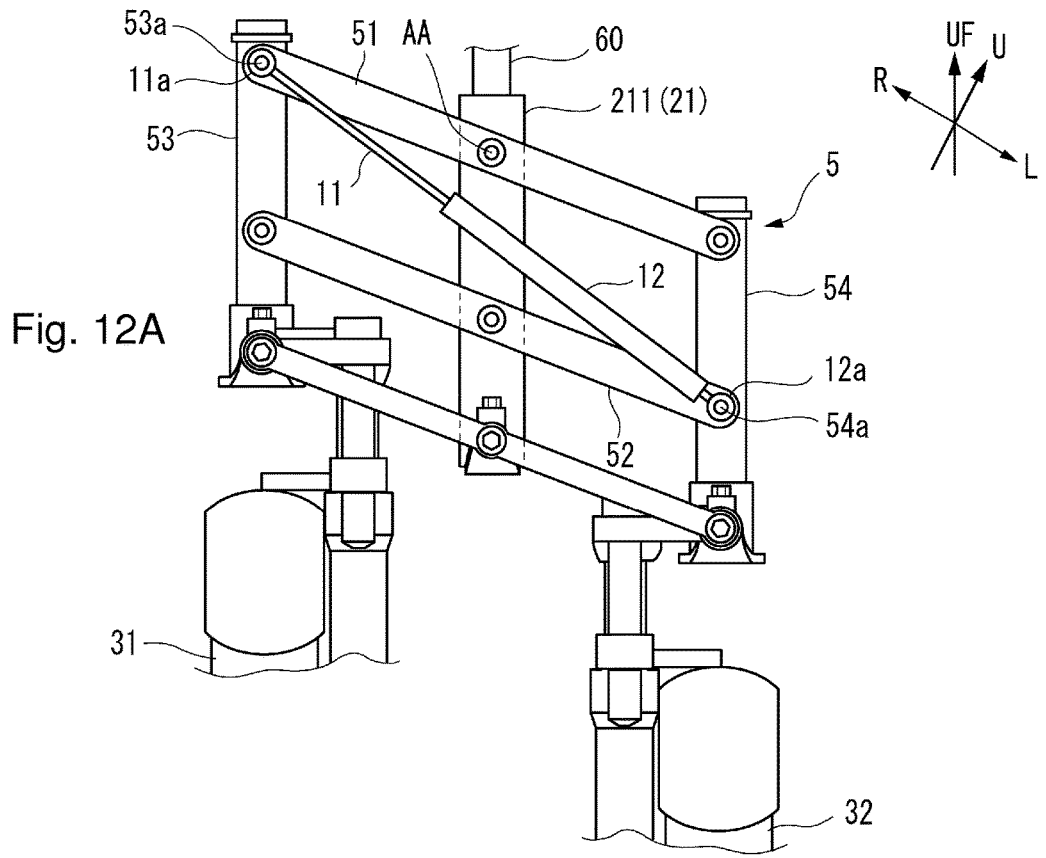
FIGS. 12A and 12B are drawings showing the resisting force change mechanism shown in FIGS. 9A and 9B when the vehicle is caused to lean.
Figure 12B:
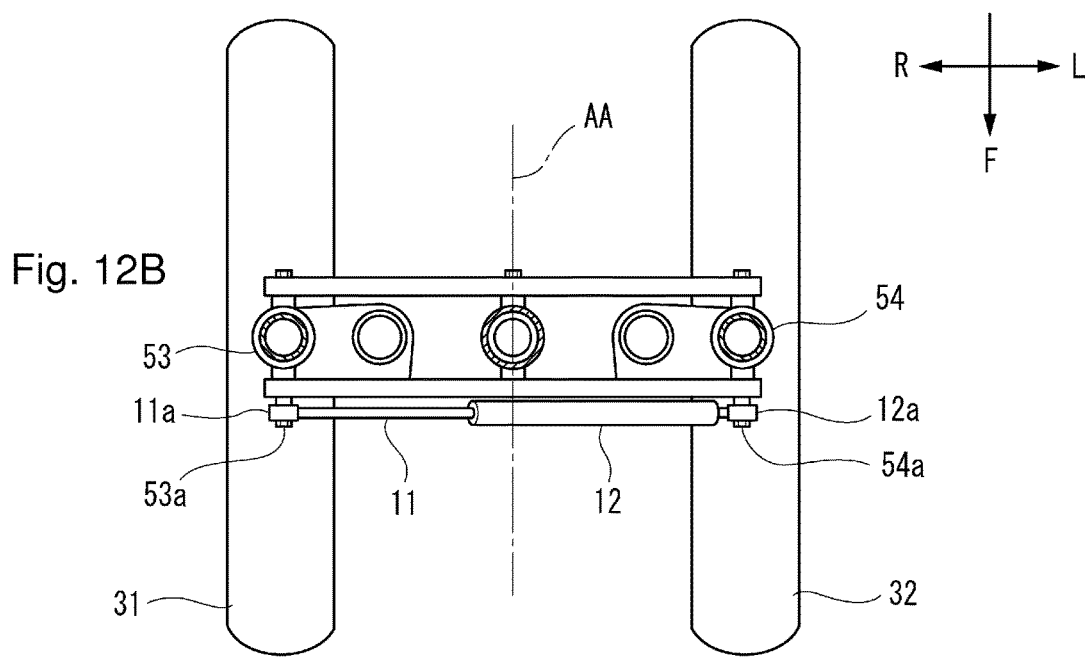
Figure 13A:
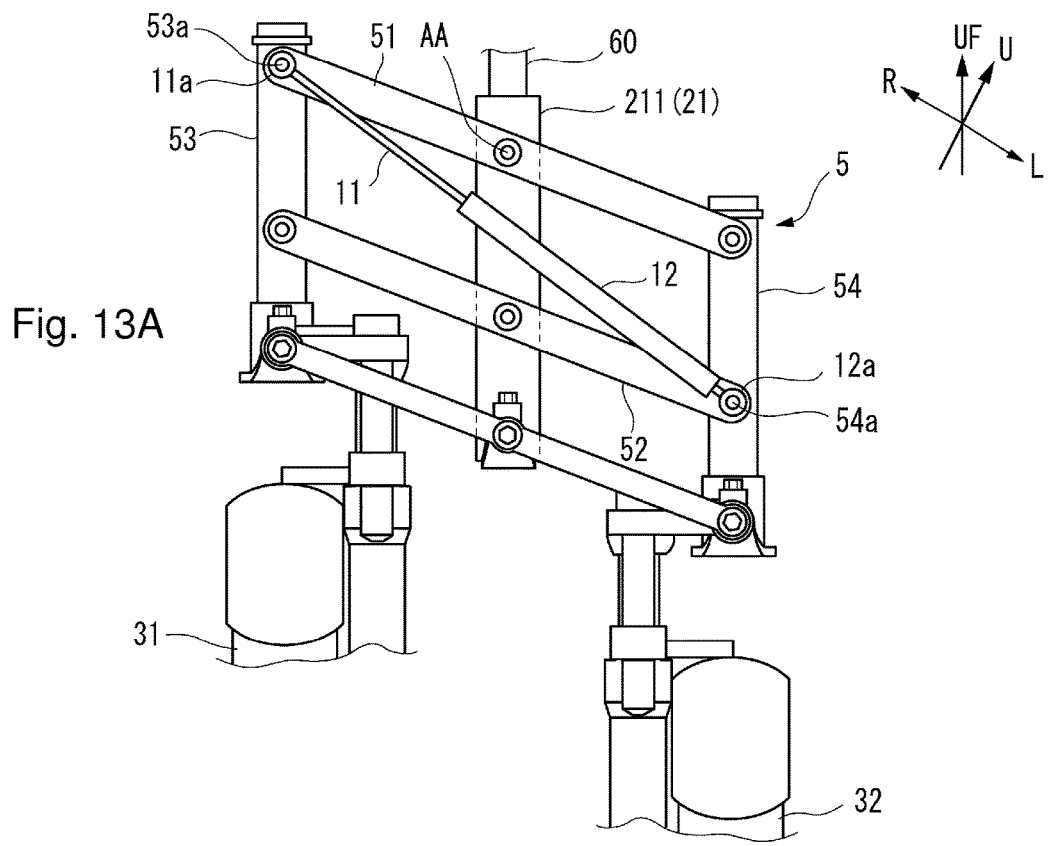
FIGS. 13A and 13B are drawings showing a state in which a portion of a vehicle according to a second preferred embodiment of the present invention is seen from the front thereof.
Figure 13B:
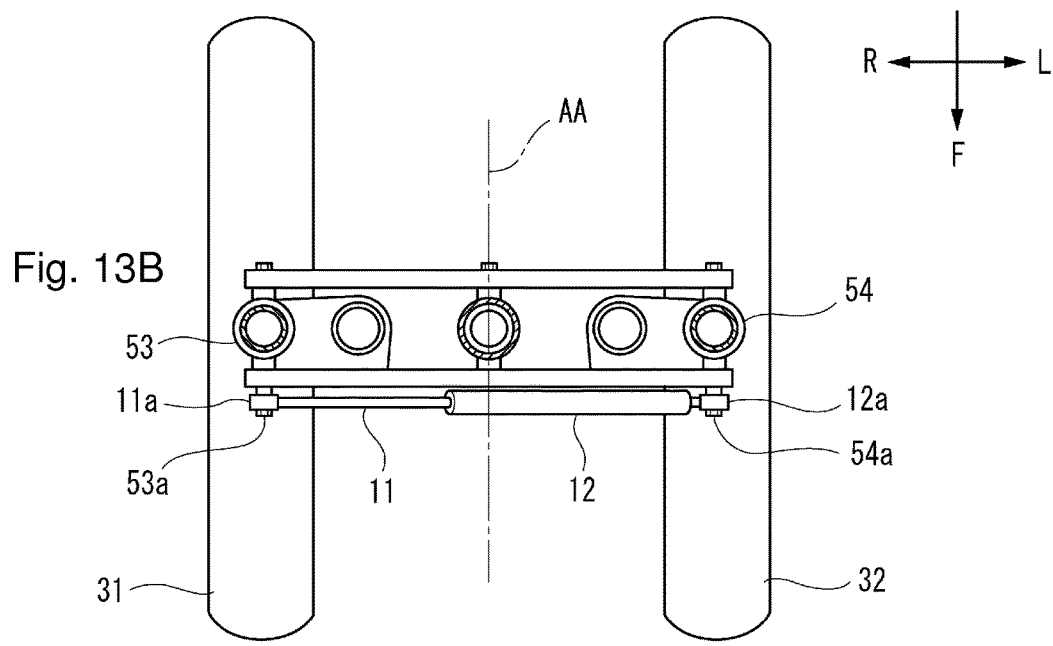

Next, referring to FIGS. 12A and 12B, the operation of the resisting force change mechanism 7 when the body frame 21 leans will be described. FIGS. 12A and 12B are drawings that correspond to FIGS. 9A and 9B, showing a state in which the body frame leans rightward. FIG. 12A shows a view resulting when a portion of the vehicle 1 is seen from the front in the direction of the upper middle axis AA. FIG. 12B shows a view resulting when the portion of the vehicle 1 is seen from the top of the body frame 21.

As shown in FIGS. 12A and 12B, when the body frame 21 leans rightward with the valve 17 opened, the first cross member 51 and the second cross member 52 turn in relation to the body frame 21. As this occurs, the first side member 53 moves upwards, while the second side member 54 moves downwards in relation to the up-and-down direction of the body frame 21. Namely, when the body frame 21 leans, the first side member 53 is displaced relative to the second side member 54. Because of this, the upper right shaft portion 53a of the first side member 53 is displaced relative to the lower left shaft portion 54a of the second side member 54.

When the relative angle of the lower left shaft portion 54a to the upper right shaft portion 53a changes, the inner support portion 11a turns about the upper right shaft portion 53a, and the outer support portion 12a turns about the lower left shaft portion 54a, such that the resisting force change mechanism 7 follows the change in angle of the link mechanism 5.

When the relative distance of the lower left shaft portion 54a to the upper right shaft portion 53a changes, the insertion length of the inner rod 11 into the outer rod 12 changes, such that the resisting force change mechanism 7 follows the change in distance of the link mechanism 5. The resisting force change mechanism 7 of the present preferred embodiment changes the resisting force against the change in relative distance of the lower left shaft portion 54a to the upper right shaft portion 53a by changing the opening of the valve 17.

When the valve 17 of the resisting force change mechanism 7 is closed completely, the insertion length of the inner rod 11 into the outer rod 12 cannot be changed. This serves to maintain the constant distance between the upper right shaft portion 53a where the inner support portion 11a of the inner rod 11 is supported and the lower left shaft portion 54a where the outer support portion 12a of the outer rod 12 is supported. Because of this, the relative movement between the first side member 53 and the second side member 54 is prevented, such that the link mechanism 5 is not allowed to be deformed. Namely, the body frame 21 holds its leaning posture. For example, with the resisting force change mechanism 7 holding the vehicle 1 in such a posture that the body frame 21 leans leftward, the vehicle is easily parked on a slope which slopes downwards from a left-hand side thereof.

According to the vehicle 1 of the present preferred embodiment, the vehicle 1 includes the resisting force change mechanism 7 which changes the resisting force that is imparted to the turning operations of the first cross member 51 and the second cross member 52 in relation to the body frame 21. The resisting force change mechanism 7 includes the inner rod 11 (the first portion) and the outer rod 12 (the second portion) that are displaced relative to each other and that change the resisting force against the relative displacement.

The inner rod 11 is supported on any one (the first side member 53) of the first side member 53, the second side member 54, the first cross member 51, and the second cross member 52 that are included in the link mechanism 5. The inner rod 11 is provided in the position where at least a portion thereof is superposed on the one member (the first side member 53) at all times as seen from the direction of the upper middle axis AA about which the first cross member 51 turns in relation to the body frame 21. The inner rod 11 is provided so as to be aligned with the one direction (the forward direction) of the forward direction and the rearward direction of the one member (the first side member 53) and the steering shaft 60 in relation to the direction of the upper middle axis AA about which the upper cross member 51 turns in relation to the body frame 21.

The outer rod 12 is supported on any other member (the second side member 54) of the body frame 21, the first side member 53, the second side member 54, the first cross member 51, the second cross member 52 that is displaced relative to the one member (the first side member 53) on which the inner rod 11 is supported. The outer rod 12 is provided in the position where at least a portion thereof is superposed on the other member (the second side member 54) at all times as seen from the direction of the upper middle axis AA about which the first cross member 51 turns in relation to the body frame 21. The outer rod 12 is provided so as to be aligned with the other member (the first side member 53) in the same direction as the one direction of the forward direction of the one member (the first side member 53) of the inner rod 11 and the steering shaft 60 in relation to the direction of the upper middle axis AA about which the first cross member 51 turns in relation to the body frame 21.

When looking at the resisting force change mechanism 7 according to the present preferred embodiment from the direction of the upper middle axis AA, the inner rod 11 is supported in the position where at least a portion thereof is superposed on the first side member 53 at all times, and the outer rod 12 is supported in the position where at least a portion thereof is superposed on the second side member 54 at all times. More specifically, a right end portion of the inner support portion 11a is situated leftward of a right end portion of the first side member 53, and a left end portion of the outer support portion 12a is situated rightward of a left end portion of the second side member 54. Because of this, even though the movable range of the resisting force change mechanism 7 becomes the largest with the body frame 21 leaning rightward to its maximum extent, the movable range of the resisting force change mechanism 7 is still situated inwards of the movable range of the link mechanism 5. Because of this, when seen from the direction of the upper middle axis AA, even though the resisting force change mechanism 7 is provided, a movable range resulting from combining together the movable range of the resisting force change mechanism 7 and the movable range of the link mechanism 5 still remains equal to or smaller than the movable range of the link mechanism 5.

When referred to herein, the movable range of the resisting force change mechanism 7 indicates an imaginary space which is occupied by loci where the first portion (the inner rod 11) and the second portion (the outer rod 12) pass when the body frame 21 is caused to lean from a state where the body frame 21 leans leftward to its maximum extent to a state where the body frame 21 leans rightward to its maximum extent.

In the present preferred embodiment, in such a state that the body frame 21 is caused to lean leftward to its maximum extent, the distance between the inner support portion 11a and the outer support portion 12a becomes the shortest and the movable range of the resisting force change mechanism 7 becomes the smallest. On the other hand, in such a state that the body frame 21 is caused to lean rightward to its maximum extent, the distance between the inner support portion 11a and the outer support portion 12a becomes the longest, and the movable range of the resisting force change mechanism 7 becomes the largest.

When referred to herein, the movable range of the link mechanism 5 indicates an imaginary space which is occupied by loci where the first cross member 51, the second cross member 52, the first side member 53, and the second side member 54 pass when the body frame 21 is caused to lean from the state where the body frame 21 leans leftward to its maximum extent to the state where the body frame 21 leans rightward to its maximum extent.

According to the vehicle 1 of the present preferred embodiment, the upper right axis, upper middle axis AA, upper left axis, lower right axis, lower middle axis, and lower left axis are parallel or substantially parallel to each other. Because of this, the first side member 53, the second side member 54, the first cross member 51, and the second cross member 52 of the link mechanism 5 turn about the axes which are parallel or substantially parallel to each other.

In the present preferred embodiment, in the resisting force change mechanism 7, the inner rod 11 moves relative to the outer rod 12. The inner rod 11 is supported on the first side member 53. The outer rod 12 is supported on the second side member 54. Since the first side member 53 and the second side member 54 move on the plane which is perpendicular or substantially perpendicular to the upper middle axis AA, the inner rod 11 and the outer rod 12 also move on the plane which is perpendicular or substantially perpendicular to the upper middle axis AA. In addition, the first cross member 51, the second cross member 52, the first side member 53, and the second side member 54 of the link mechanism 5 all move on the plane which is perpendicular or substantially perpendicular to the upper middle axis AA. Because of this, interference between the link mechanism 5 and a tilt lock mechanism is prevented.

In addition, the inner rod 11 is aligned in front of the first side member 53 and in front of the steering shaft 60 while being disposed adjacent to the first side member 53 in relation to the direction of the upper middle axis AA. The outer rod 12 is aligned in front of the second side member 54 and in front of the steering shaft 60 while being disposed adjacent to the second side member 54. Namely, the link mechanism 5 and the steering shaft 60 are provided between the inner rod 11 and the outer rod 12. Because of this, the interference between the link mechanism 5 and the resisting force change mechanism 7 is avoided.

Further, the inner rod 11 is aligned in front of the first side member 53 and in front of the steering shaft 60 while being disposed adjacent to the first side member 53 in relation to the direction of the upper middle axis AA. The outer rod 12 is aligned in front of the second side member 54 and in front of the steering shaft 60 while being disposed adjacent to the second side member 54. As described above, since the moving directions of the inner rod 11 and the outer rod 12 of the resisting force change mechanism 7 and the moving directions of the individual members of the link mechanism 5 are aligned, in relation to the direction of the upper middle axis AA, even though the resisting force change mechanism 7 is disposed so as to be adjacent to the link mechanism 5, the resisting force change mechanism 7 does not interfere with the link mechanism 5. Namely, when the vehicle 1 is seen from the side thereof, the resisting force change mechanism 7 and the link mechanism 5 are disposed so as to be aligned close to each other in relation to the direction of the upper middle axis AA, such that it is possible to make the total movable range small that results from combining the movable range of the resisting force change mechanism 7 and the movable range of the link mechanism 5.

In the present preferred embodiment, when the vehicle is seen from the side thereof, the movable range of the resisting force change mechanism 7 is a rectangular or substantially rectangular space through which the inner rod 11 and the outer rod 12 pass, and the movable range of the link mechanism 5 is also a rectangular or substantially rectangular space. Since these two rectangular or substantially rectangular spaces are arranged so as to be aligned with each other in the direction of the upper middle axis AA, the peripheral space of the steering shaft 60 is used efficiently. Namely, according to the present preferred embodiment, since the moving direction of the resisting force change mechanism 7 is aligned with the moving direction of the link mechanism 5, the resisting force change mechanism 7 and the link mechanism 5 are disposed so as to narrow the space therebetween in relation to the direction of the upper middle axis AA.

In this description, when elements are described as "being aligned with each other in the direction of the upper middle axis AA," this includes a defined space provided between the inner rod 11 and the member (the first cross member 51) of the link mechanism 5 in relation to the direction of the upper middle axis AA. However, it is preferable that the inner rod 11 and the member (the first cross member 51) of the link mechanism 5 are disposed with no other member interposed therebetween, as done in the present preferred embodiment.

For the reasons described above, according to the vehicle 1 of the present preferred embodiment, when the vehicle 1 is seen from the side or when the vehicle 1 is seen from the direction of the upper middle axis AA, it is possible to prevent enlargement of the movable range that results from combining the movable range of the link mechanism 5 and the movable range of the resisting force change mechanism 7. Because of this, even though the resisting force change mechanism 7 is installed in the vehicle 1 so as to avoid interference with the link mechanism 5 and the steering shaft 60, the peripheral construction of the steering shaft 60 is not enlarged.

Second Preferred Embodiment

Next, second to seventh preferred embodiments of the present invention will be described below. The second to seventh preferred embodiments of the present invention differ from the first preferred embodiment described above in that modifications are made only to the resisting force change mechanism, and hence, a modified resisting force change mechanism will mainly be described. Elements having the same or like configurations to those of the elements of the first preferred embodiment will be omitted or like reference numerals will be given thereto, so as to eliminate the repetition of the same or similar descriptions.

Figure 14:
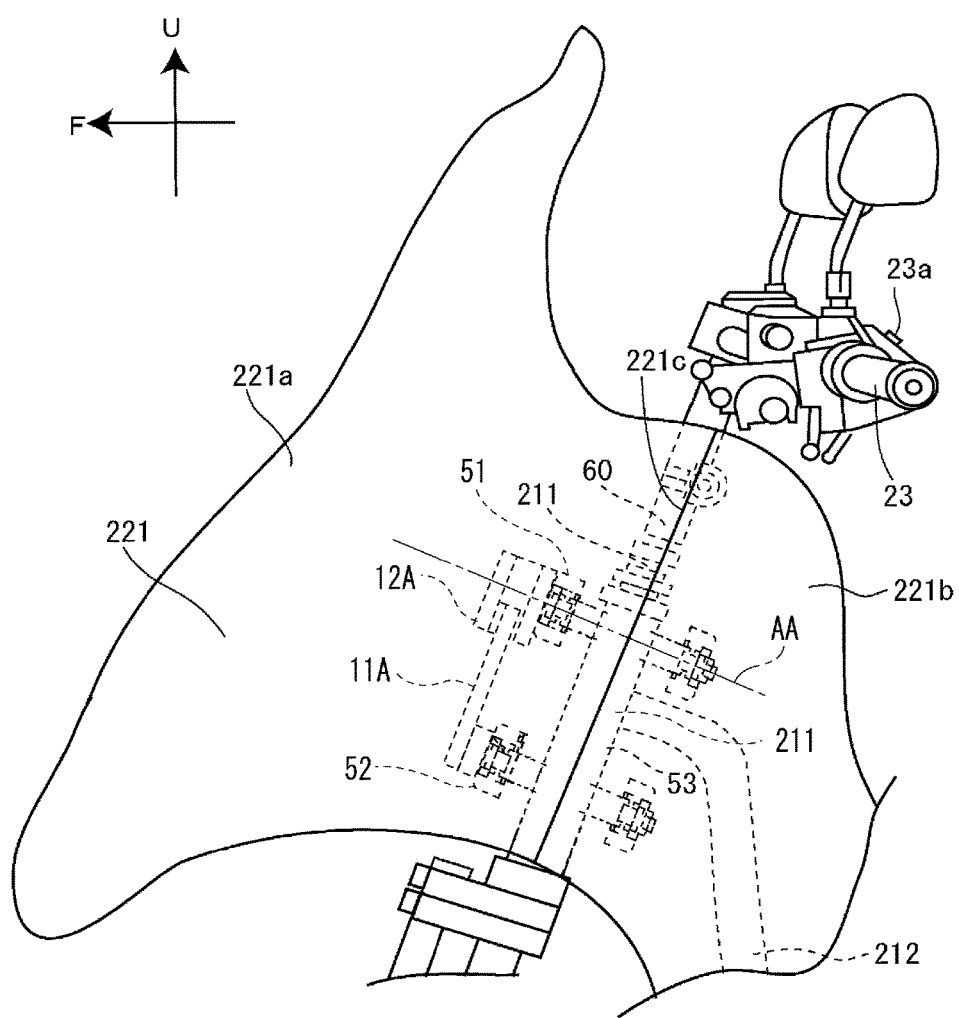
FIG. 14 is a drawing showing a state in which a portion of the vehicle according to the second preferred embodiment of the present invention is seen from a side thereof.

FIG. 14 is a side view of a portion of the vehicle according to the second preferred embodiment of the present invention as seen from a left-hand side thereof.

In the present preferred embodiment, a resisting force change mechanism includes a so-called disc brake construction. A construction that is similar to this construction is disclosed in Japanese Patent Unexamined Publication JP-A-2005-313876. The resisting force change mechanism includes a semicircular disc (a first portion) 11A and a frictional force imparting portion 12A (a second portion).

The disc 11A is fixed to a front surface of a second cross member 52. The disc 11A is fixed to the second cross member 52 in such a posture that a normal direction of the disc 11A is oriented in the direction of a lower middle axis of the second cross member 52. A straight-line portion of the semicircular disc 11A is fixed to the second cross member 52. An arc-shaped portion of the semicircular disc 11A projects upwards from the second cross member 52.

The frictional force imparting portion 12A is fixed to the headpipe 211 that is a portion of a body frame 21 in front of a first cross member 51. The frictional force imparting portion 12A is fixed to a penetrating support portion that extends from the headpipe 211 to the front through the first cross member 51. The penetrating support portion extends along an upper middle axis AA. The frictional force imparting portion 12A preferably has a construction similar to that of a caliper brake, for example. The frictional force imparting portion 12A includes friction pads in a position which face the disc 11A. The friction pads still remain facing an outer circumferential portion of the disc 11A at all times even though the link mechanism 5 operates, deforming the second cross member 52 relative to the penetrating support portion.

The relative displacement between the frictional force imparting portion 12A and the disc 11A is suppressed as a result of the frictional force imparting portion 12A holding the disc 11A with the pair of friction pads therebetween. The resisting force change mechanism changes resisting force against the relative displacement between the frictional force imparting portion 12A and the disc 11A by controlling the holding force with which the disc 11A is held by the friction pads therebetween.

When the link mechanism 5 operates, the second cross member 52 turns about the lower middle axis in relation to the body frame 21. The disc 11A of the resisting force change mechanism is supported on the second cross member 52, and the frictional force imparting portion 12A is supported on the body frame 21. Because of this, a relative angle between the disc 11A and the frictional force imparting portion 12A changes according to a turning motion of the second cross member 52 in relation to the body frame 21 as seen from the front in the direction of the upper middle axis AA. The resisting force against the change in relative angle between the disc 11A and the frictional force imparting portion 12A is changed by the frictional force imparting portion 12A applying the frictional force to the disc 11A.

Since the disc 11A is fixed to the second cross member 52 as seen from the direction of the upper middle axis AA, the disc 11A is provided in a position where at least a portion thereof is superposed on the second cross member 52 at all times. Similarly, since the frictional force imparting portion 12A is fixed to the headpipe 211, the frictional force imparting portion 12A is provided in a position where at least a portion thereof is superposed on the headpipe 211 at all times. Because of this, a movable range of the resisting force change mechanism is situated inside a movable range of the link mechanism 5 as seen from the direction of the upper middle axis AA.

As shown in FIG. 14, the disc 11A is disposed in front of a steering shaft 60 and in front of the second cross member 52 in relation to the upper middle axis AA. The disc 11A is disposed so as to be aligned with the steering shaft 60 and the second cross member 52 in relation to the direction of the upper middle axis AA.

The frictional force imparting portion 12A is disposed in front of the steering shaft 60 and disposed in front of the headpipe 211 in relation to the upper middle axis AA. The frictional force imparting portion 12A is disposed so as to be aligned with the steering shaft 60 and the second cross member 52 in relation to the direction of the upper middle axis AA.

The disc 11A is fixed to the second cross member 52, and the frictional force imparting portion 12A is fixed to the body frame 21. Therefore, the frictional force imparting portion 12A turns about the lower middle axis in relation to the disc 11A. Namely, the direction in which the disc 11A is displaced relative to the frictional force imparting portion 12A is aligned with the direction in which the link mechanism 5 is displaced relatively. Because of this, the interference between the resisting force change mechanism and the link mechanism 5 is suppressed.

Further, the disc 11A and the frictional force imparting portion 12A are disposed in front of the steering shaft 60 and in front of the second cross member 52. Because of this, the disc 11A and the frictional force imparting portion 12A do not interfere with the steering shaft 60 and the second cross member 52.

Because of this, as shown in FIG. 14, the disc 11A and the frictional force imparting portion 12A are disposed so as to be aligned with the steering shaft 60 and the second cross member 52 in relation to the direction of the upper middle axis AA. Namely, since the resisting force change mechanism is configured so as not to interfere with the link mechanism 5, a movable range of the resisting force change mechanism is disposed so as to be close to a movable range of the link mechanism 5 in relation to the direction of the upper middle axis AA. This enables the link mechanism 5 and the resisting force change mechanism to be compact as seen from the side of the vehicle.

Thus, for the reasons described above, even though the resisting force change mechanism is provided, it is possible to provide the vehicle in which a peripheral portion of the steering shaft 60 which is above the front wheels 31, 32 is not enlarged.

Third Preferred Embodiment

Figure 16:
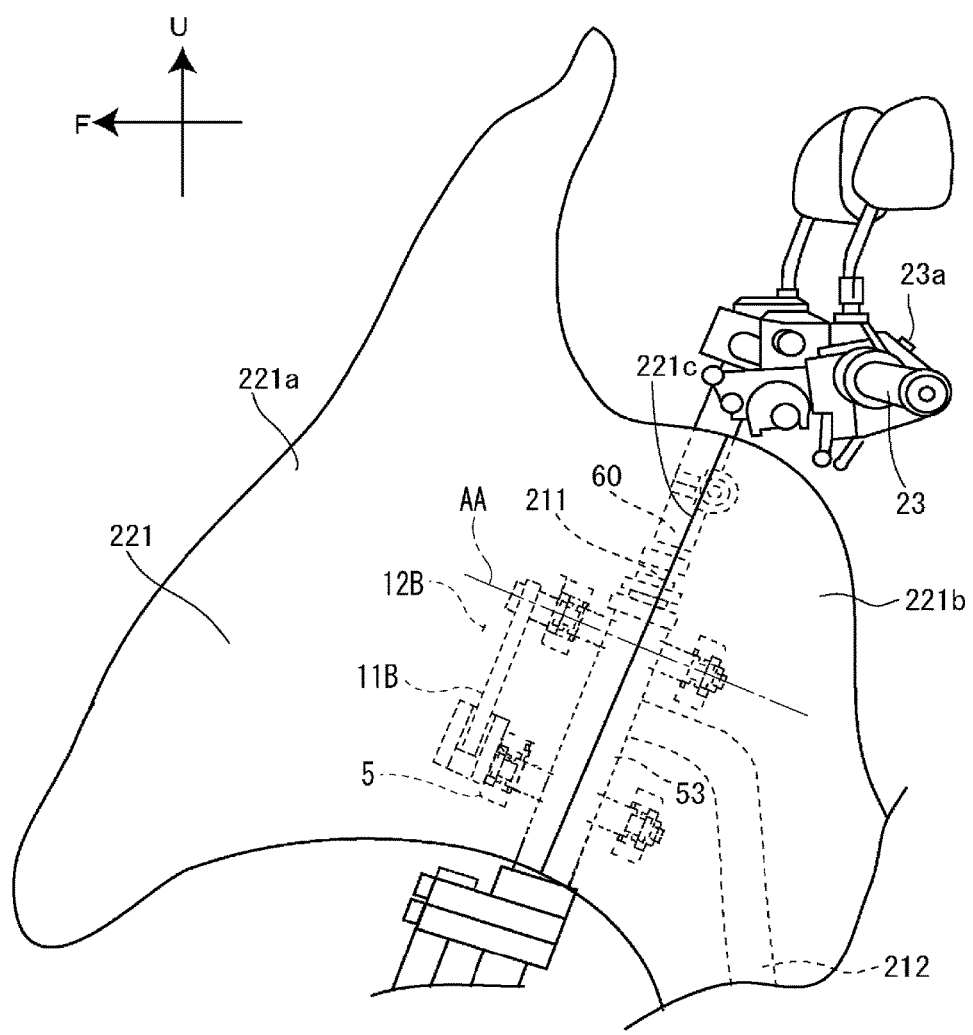
FIG. 16 is a drawing showing a state in which a portion of the vehicle according to the third preferred embodiment of the present invention is seen from a side thereof.

FIGS. 15A to 15C show front views showing portions of a vehicle according to a third preferred embodiment of the present invention. FIGS. 15A to 15C show portions of the vehicle as seen from the front in the direction of an upper middle axis AA. FIG. 15A shows the vehicle 1 which is in an upright state of the body frame 21. FIG. 15B shows the vehicle 1 with the body frame 21 leaning leftward. FIG. 15C shows the vehicle 1 with the body frame 21 leaning rightward. FIG. 16 is a side view of a portion of the vehicle according to the second preferred embodiment as seen from a left-hand side thereof.

In the present preferred embodiment, a resisting force change mechanism 7B includes a curved plate (a first portion) 11B that is curved as seen from the direction of the middle upper axis AA and a frictional force imparting portion 12B (a second portion).

The curved plate 11B is an elongated plate-shaped member that extends in a left-and-right direction of a body frame 21. A root portion of the curved plate 11B is supported at an upper left shaft portion 54b of a second side member 54 so as to turn thereabout. The upper left shaft portion 54b of the second side member 54 extends to the front along an upper left axis. The curved plate 11B extends towards a first side member 53 while extending upwards in a curved fashion.

The frictional force imparting portion 12B is fixed to a lower middle shaft portion 52a that extends forward from a headpipe 211 that is a portion of the body frame 21 through the second cross member 52. The lower middle shaft portion 52a extends parallel or substantially parallel to a lower middle axis. The frictional force imparting portion 12B includes a guide hole through which the curved plate 11B is inserted in the left-and-right direction of the body frame 21. The frictional force imparting portion 12B preferably has a construction similar to that of a caliper brake, for example. The frictional force imparting portion 12B includes friction pads in a position which face the curved plate 11B.

The relative displacement between the frictional force imparting portion 12B and the curved plate 11B is suppressed as a result of the frictional force imparting portion 12B holding the curved plate 11B with the pair of friction pads therebetween. A resisting force against the relative displacement between the frictional force imparting portion 12B and the curved plate 11B is changed by controlling the holding force with which the curved plate 11B is held by the friction pads therebetween.

When a link mechanism 5 operates, the second side member 54 moves relative to the lower middle axis of the body frame 21. Because of this, as seen from the front in the direction of the upper middle axis AA, the upper left shaft portion 54b of the second side member 54 and the lower middle shaft portion 52a of the second cross member 52 are displaced relative to each other according to a turning motion of the second cross member 52 in relation to the body frame 21.

The resisting force change mechanism 7B follows a relative change in an angle defined by the upper left shaft portion 54b and the lower middle shaft portion 52a as seen from the front in the direction of the upper middle axis AA by the root portion of the curved plate 11B turning in relation to the upper left shaft portion 54b. The resisting force change mechanism 7B follows a change in relative distance between the upper left shaft portion 54b and the lower middle shaft portion 52a as seen from the front in the direction of the upper middle axis AA by changing an insertion length of the curved plate 11B into the frictional force imparting portion 12B.

For example, as shown in FIG. 15B, when the body frame 21 leans leftward, the upper left shaft portion 54b of the second side member 54 is displaced relative to the lower middle shaft portion 52a of the second cross member 52. In the resisting force change mechanism 7B, the curved plate 11B turns about the upper left shaft portion 54b at the root portion, such that the insertion length of the curved plate 11B into the frictional force imparting portion 12B is increased. The frictional force imparting portion 12B faces a portion of the curved plate 11B that lies near to a distal end thereof.

On the contrary, as shown in FIG. 15C, when the body frame 21 leans rightward, the curved plate 11B turns about the upper left shaft portion 54b at the root portion, and the relative distance between the upper left shaft portion 54b of the second side member 54 and the lower middle shaft portion 52a of the second cross member 52 is increased. Because of this, the curved plate 11B is pulled out of the frictional force imparting portion 12B. The frictional force imparting portion 12B faces a portion of the curved plate 11B that is near to the upper left shaft portion 54b.

The resisting force change mechanism 7B changes a resisting force against the relative displacement between the curved plate 11B and the frictional force imparting portion 12B by changing a frictional force that is applied to the curved plate 11B at the frictional force imparting portion 12B, thus making it possible to change the ease with which the body frame 21 is caused to lean.

In the present preferred embodiment, too, the root portion of the curved plate 11B is supported at the upper left shaft portion 54b of a second side member 54. Because of this, the curved plate 11B is provided in a position where at least a portion thereof including the root portion is superposed on the second side member 54 at all times as seen from the front in the direction of the upper middle axis AA.

In addition, the frictional force imparting portion 12B is fixed to the lower middle shaft portion 52a of the headpipe 211. Because of this, the frictional force imparting portion 12B is provided in a position where at least a portion thereof is superposed on the headpipe 211 at all times as seen from the front in the upper middle axis AA.

Because of this, a movable range of the resisting force change mechanism 7B is made smaller than a movable range of the link mechanism 5 as seen from the front in the direction of the upper middle axis AA.

Additionally, in the present preferred embodiment, too, the curved plate 11B turns about the upper left shaft portion 54b that extends in the direction of an upper left axis that is parallel or substantially parallel to the upper middle axis AA. The frictional force imparting portion 12B is fixed to the headpipe 211. Because of this, the resisting force change mechanism 7B moves on a plane that is perpendicular or substantially perpendicular to the upper middle axis AA. A first cross member 51, the second cross member 52, a first side member 53, and the second side member 54 of the link mechanism 5 also move on a plane which is perpendicular or substantially perpendicular to the upper middle axis AA. Because of this, since the moving direction of the members of the resisting force change mechanism 7B is aligned with the moving direction of the members of the link mechanism 5, it is difficult for the members to interfere with each other.

Further, as shown in FIG. 16, the curved plate 11B is disposed in front of a steering shaft 60 and in front of the second side member 54. When looking at the vehicle 1 from the side thereof, the curve plate 11B is disposed so as to be aligned with the second side member 54 and the first cross member 51 (or the second cross member 52) in relation to the direction of the upper middle axis AA.

The frictional force imparting portion 12B is also disposed in front of the steering shaft 60 and in front of the second side member 54. The frictional force imparting portion 12B is disposed so as to be aligned with the headpipe 211 and the second cross member 52.

Since the moving direction of the members of the resisting force change mechanism 7B is aligned with the moving direction of the members of the link mechanism 5, the resisting force change mechanism 7B and the link mechanism 5 are disposed close to each other in relation to the direction of the upper middle axis AA. This makes the vehicle 1 compact as seen from the side thereof.

Thus, for the reasons described above, in the vehicle according to the present preferred embodiment, too, it is difficult to enlarge the size of the peripheral portion of the steering shaft even though the resisting force change mechanism 7B is provided on the vehicle.

Fourth Preferred Embodiment

Next, referring to FIGS. 17A, 17B, and 18, a vehicle according to a fourth preferred embodiment of the present invention will be described.

FIGS. 17A and 17B show front views showing a portion of the vehicle according to the fourth preferred embodiment. FIGS. 17A and 17B show a portion of the vehicle as seen from the front in the direction of an upper middle axis AA. FIG. 17A shows the vehicle 1 which is in an upright state of the body frame 21. FIG. 17B shows the vehicle 1 with the body frame 21 leaning leftward. FIG. 18 is a side view of a portion of the vehicle according to the fourth preferred embodiment as seen from a left-hand side thereof.

In the present preferred embodiment, the inner support portion of the inner rod and the outer support portion of the outer rod of the first preferred embodiment are modified. In the present preferred embodiment, an inner support portion 11Ca of an inner rod 11C is provided on a first side member 53. The inner support portion 11Ca is supported at a lower shaft portion 53c of the first side member 53 so as to turn thereabout. The lower shaft portion 53c of the first side member 53 projects forward in a position below a lower right axis of the first side member 53 and in a direction parallel or substantially parallel to the lower right axis.

An outer support portion 12Ca of an outer rod 12C is provided on a headpipe 211 of the body frame 21. The outer support portion 12Ca is supported at an upper middle shaft portion 211a of the headpipe 211 so as to turn thereabout. The upper middle shaft portion 211a projects forward along the upper middle axis AA and penetrates the first cross member 51.

In the present preferred embodiment, too, the inner rod 11C is provided in a position where at least a portion thereof including the inner support portion 11Ca is superposed on the first side member 53 at all times. In addition, the outer rod 12C is provided in a position where at least a portion thereof including the outer support portion 12Ca is superposed on the headpipe 211 at all times. Because of this, a resisting force change mechanism 7C is compact as seen from the front in the direction of the upper middle axis AA.

In addition, in the present preferred embodiment, too, the inner rod 11C and the outer rod 12C move on a plane that is perpendicular or substantially perpendicular to the upper middle axis AA. In addition, the first cross member 51, a second cross member 52, a first side member 53, and a second side member 54 of a link mechanism 5 also move on a plane which is perpendicular or substantially perpendicular to the upper middle axis AA. The moving directions of the members of the resisting force change mechanism 7C and the members of the link mechanism 5 are aligned with each other, and therefore, it is difficult for the members to interfere with each other.

Figure 18:
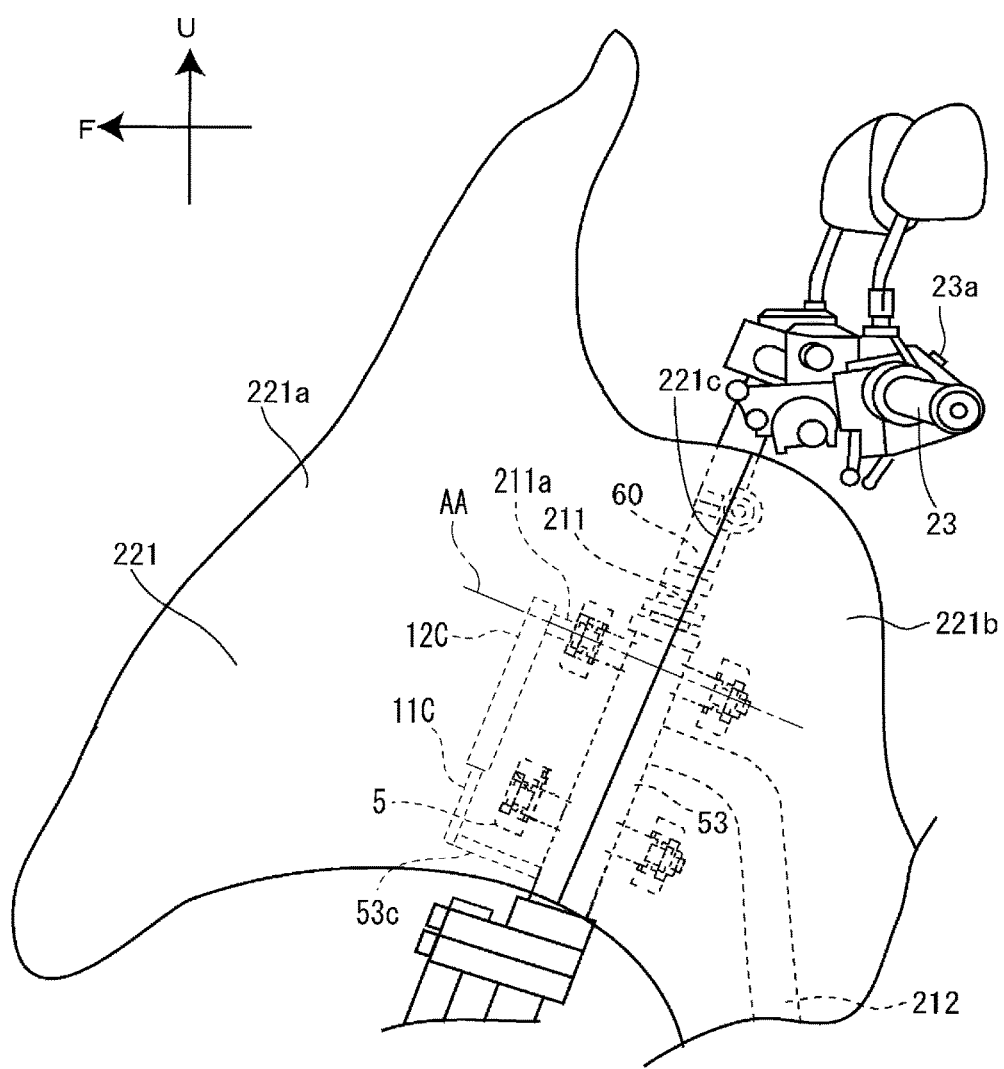
FIG. 18 is a drawing showing a state in which the vehicle according to the fourth preferred embodiment of the present invention is seen from a side thereof.

Further, as shown in FIG. 18, the inner rod 11C is disposed in front of a steering shaft 60 and in front of the first side member 53. The inner rod 11C is disposed so as to be aligned with the first side member 53 in relation to the direction of the upper middle axis AA.

The outer rod 12C is disposed in front of the steering shaft 60 and in front of the first cross 51 and the second cross member 52. The outer rod 12C is disposed so as to be aligned with the first cross member 51 and the second cross member 52 in relation to the direction of the upper middle axis AA.

Since the moving direction of the members of the resisting force change mechanism 7C is aligned with the moving direction of the link mechanism 5, the resisting force change mechanism 7C and the link mechanism 5 are disposed close to each other when the vehicle is seen from the side thereof.

Thus, for the reasons described above, even though the resisting force change mechanism 7C is installed in the vehicle, the construction around the periphery of the steering shaft 60 above the two front wheels 31, 32 is prevented from being enlarged in size.

In addition, according to the vehicle of the present preferred embodiment, the outer rod 12C, which is a second portion, is supported on the headpipe 211 which is a portion of the body frame 21. The inner rod 11C, which is a first portion, is supported on the first side member 53 that is one of the members of the link mechanism 5 and that move relative to the headpipe 211.

The first cross member 51, the second cross member 52, the first side member 53, and the second side member 54 of the link mechanism 5 all move relative to the body frame 21. Because of this, when the second portion of the resisting force change mechanism is supported on the body frame 21, the first portion should be supported on any one of the members (the first cross member 51, the second cross member 52, the first side member 53, and the second side member 54) of the link mechanism 5. Namely, since the member on which the first portion is supported is able to be selected freely from the members of the link mechanism, the degree of freedom in designing the resisting force change mechanism is enhanced. The space around the periphery of the steering shaft 60 is used efficiently while taking the layout of other on-board components that are disposed around the periphery of the steering shaft 60 into consideration when locating the resisting force change mechanism. Because of this, even though the resisting force change mechanism is installed in the vehicle, it is difficult to enlarge the peripheral construction of the steering shaft 60.

Incidentally, the first cross member 51 is disposed and on-board components such as lamps or the like are disposed in a space defined above a position where the first side member 53 supports the second cross member 52, and this space is easily used as a space where other on-board components are located.

In the present preferred embodiment, the inner rod 11C, which is the first portion, is supported on the first side member 53 below the position where the first side member 53 supports the second cross member 52. In the present preferred embodiment, in avoiding the space described above, the first side member 53 is caused to support the first portion below the position where the first side member 53 supports the second cross member 52 to prevent the interference with the other members. Because of this, the resisting force change mechanism 7C is easily arranged without taking interference with the other components into consideration. Thus, even though the resisting force change mechanism 7C is provided, enlargement of the vehicle is prevented. The inner rod 11C, which is the first portion, is preferably supported on the second side member 54 below the position where the second side member 54 supports the second cross member 52. The same advantages as described above are also be obtained by this configuration.

Fifth Preferred Embodiment

Next, referring to FIG. 19, a vehicle according to a fifth preferred embodiment of the present invention will be described.

Figure 19:
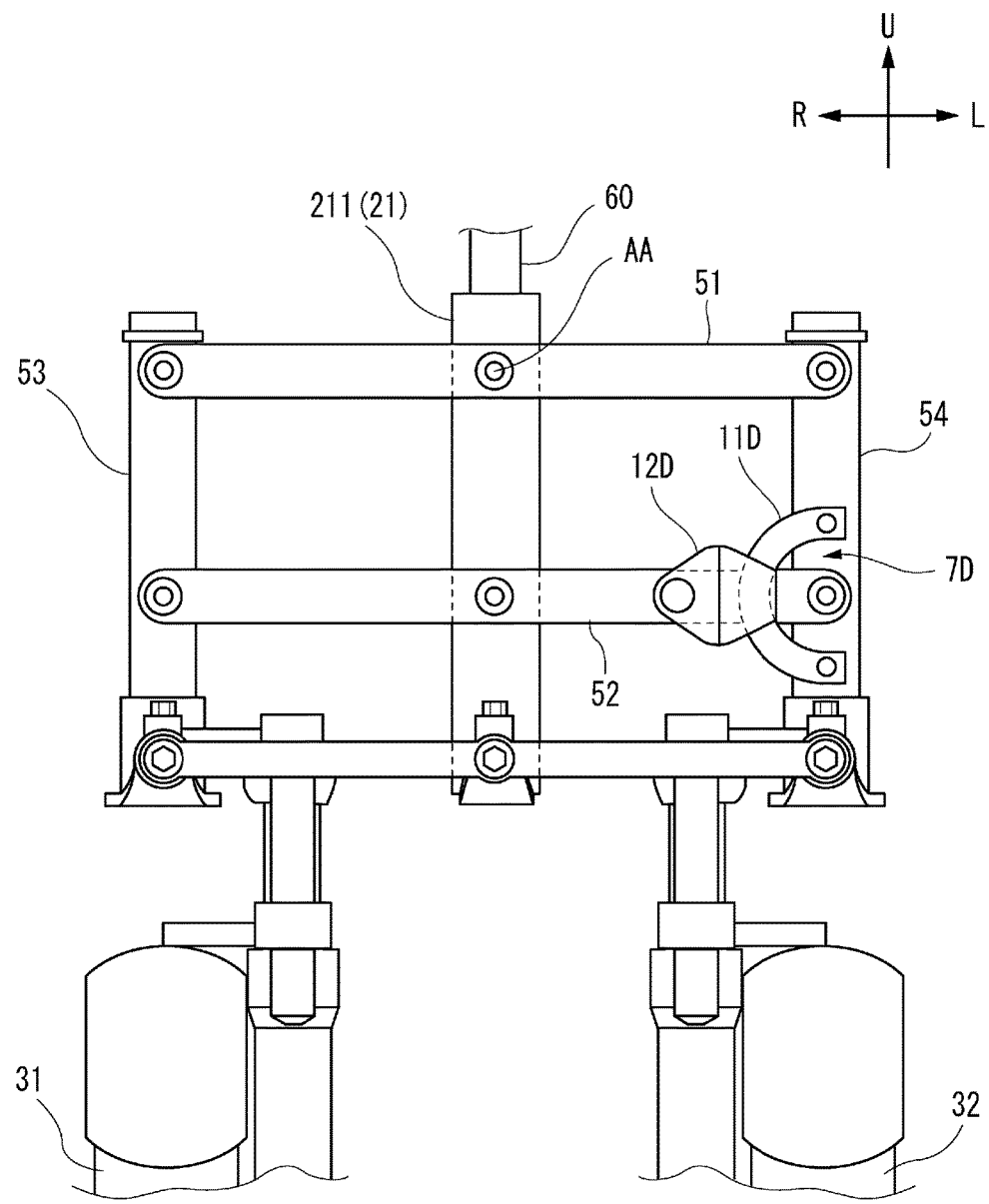
FIG. 19 is a drawing showing a state in which a portion of a vehicle according to a fifth preferred embodiment of the present invention is seen from the front thereof.

As shown in FIG. 19, in the present preferred embodiment, the position where the disc and the frictional force imparting portion are provided in the second preferred embodiment is modified. In the present preferred embodiment, a disc 11D of a resisting force change mechanism 7D is fixed to a second side member 54. A frictional force imparting portion 12D is fixed to a second cross member 52.

When a body frame 21 leans, the second side member 54 turns about a lower left axis in relation to the second cross member 52. The disc 11D is fixed to the second side member 54 and the frictional force imparting portion 12D is fixed to the second cross member 52. Because of this, when a link mechanism 5 operates, the relative position between the disc 11D and the frictional force imparting portion 12D changes. In the present preferred embodiment, the frictional force imparting portion 12D turns about the lower left axis that defines the center of the semicircular disc 11D.

The relative displacement between the disc 11D and the frictional force imparting portion 12D is suppressed by the frictional force imparting portion 12D imparting a frictional force to the disc 11D, thus making it possible to control the ease with which the vehicle is caused to lean.

In the present preferred embodiment, too, the disc 11D is provided in a position where at least a portion thereof is superposed on the second side member 54 at all times as seen from the front in the direction of the upper middle axis AA. The frictional force imparting portion 12D is provided in a position where at least a portion thereof is superposed on the second cross member 52 at all times. Because of this, a movable range of the resisting force change mechanism 7D is smaller than a movable range of the link mechanism 5 as seen from the front in the direction of the upper middle axis AA.

In addition, the disc 11D is fixed to the second side member 54, and the disc 11D moves together with the second side member 54. The frictional force imparting portion 12D is fixed to the second cross member 52, and the frictional force imparting portion 12D moves together with the second cross member 52. The moving direction of the disc 11D and the frictional force imparting portion 12D of the resisting force change mechanism 7D and the moving direction of the members of the link mechanism 5 are aligned with each other, and therefore, the resisting force change mechanism 7D is difficult to interfere with the link mechanism 5.

The disc 11D is provided in front of the steering shaft 60 and is provided in front of the second side member 54. The frictional force imparting portion 12D is provided in front of the steering shaft 60 and is provided in front of the second cross member 52.

Since the moving direction of the members (the disc 11D, the frictional force imparting portion 12D) of the resisting force change mechanism 7D and the moving direction of the members of the link mechanism 5 are aligned with each other, the resisting force change mechanism 7D and the link mechanism 5 are disposed so as to be close to each other in relation to the direction of the upper middle axis AA. Because of this, a movable range of the resisting force change mechanism 7D and the movable range of the link mechanism 5 are compact when the vehicle is seen from a side thereof.

Thus, for the reasons described above, even though the resisting force change mechanism 7D is installed in the vehicle, the construction around the periphery of the steering shaft 60 that is above two front wheels 31, 32 is prevented from being enlarged in size.

Sixth Preferred Embodiment

Next, referring to FIG. 20, a sixth preferred embodiment of the present invention will be described. In the present preferred embodiment, the position where the curved plate is attached in the third preferred embodiment is modified.

Figure 20:
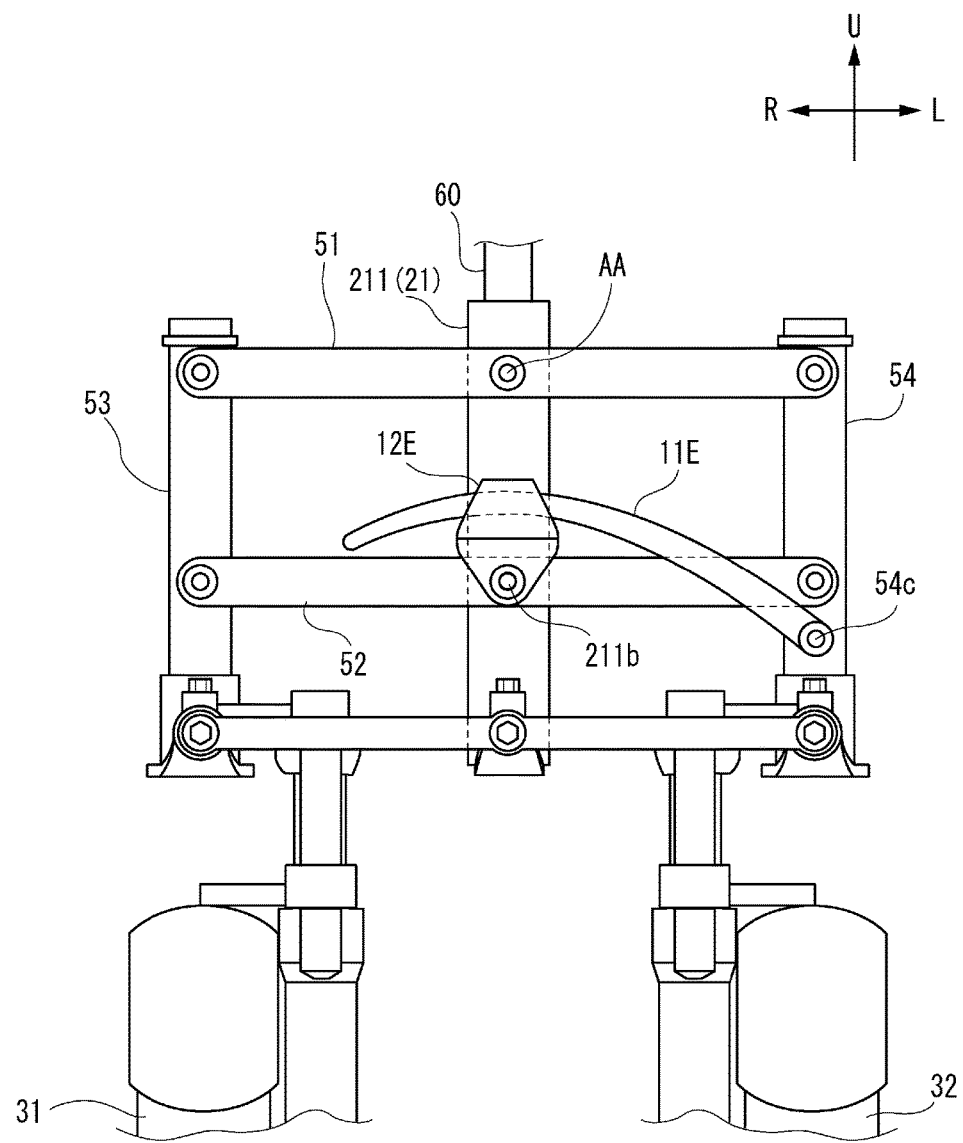
FIG. 20 is a drawing showing a state in which a portion of a vehicle according to a sixth preferred embodiment of the present invention is seen from the front thereof.

As shown in FIG. 20, a root portion of a curved plate 11E is supported at a lower shaft portion 54c of a second side member 54 so as to turn thereabout. The lower shaft portion 54c is situated below a lower left axis of the second side member 54. The lower shaft portion 54c projects forward in a direction that is parallel or substantially parallel to the lower left axis.

The frictional force imparting portion 12E is fixed to a headpipe 211. The frictional force imparting portion 12E is fixed to a lower middle shaft portion 211b of the headpipe 211. The lower middle shaft portion 211b projects forward from the headpipe 211 in the direction of the lower middle axis of the headpipe 211. The lower middle shaft portion 211b projects forward through a second cross member 52.

In the present preferred embodiment, a root portion of the curved plate 11E is supported at a lower shaft portion 54c of the second side member 54. The frictional force imparting portion 12E is fixed to the lower middle shaft portion 211b of the headpipe 211. Because of this, as seen from the front in the direction of an upper middle axis AA, the curved plate 11E is provided in a position where at least a portion thereof is superposed on the second side member 54 at all times, and the frictional force imparting portion 12E is provided in a position where at least a portion thereof is superposed on the second cross member 52 at all times. Because of this, as seen from the front in the direction of the upper middle axis AA, a movable range of the resisting force change mechanism 7E is smaller than a movable range of the link mechanism 5.

The curved plate 11E is supported on the lower shaft portion 54c of the left side member so as to turn about a turning axis that is parallel or substantially parallel to the upper middle axis AA. The frictional force imparting portion 12E is fixed to the headpipe 211. Because of this, since the moving direction of the members of the resisting force change mechanism 7E is aligned with the moving direction of the members of a link mechanism 5.

The curved plate 11E is disposed in front of a steering shat 60 and is disposed in front of the second side member 54. The frictional force imparting portion 12E is disposed in front of the steering shaft 60 and is disposed in front of the headpipe 211. Since the moving direction of the members of the resisting force change mechanism 7E is aligned with the moving direction of the members of the link mechanism 5, the resisting force change mechanism 7E and the link mechanism 5 are disposed close to each other in relation to the direction of the upper middle axis AA. This enables a movable range that results from combining together a movable range of the resisting force change mechanism 7E and a movable range of the link mechanism 5 to be small in relation to the direction of the upper middle axis AA.

Thus, for the reasons described above, even though the resisting force change mechanism 7E is installed in the vehicle, the construction around the periphery of the steering shaft 60 that is above two front wheels 31, 32 is prevented from being enlarged in size.

Seventh Preferred Embodiment

Figure 21A:
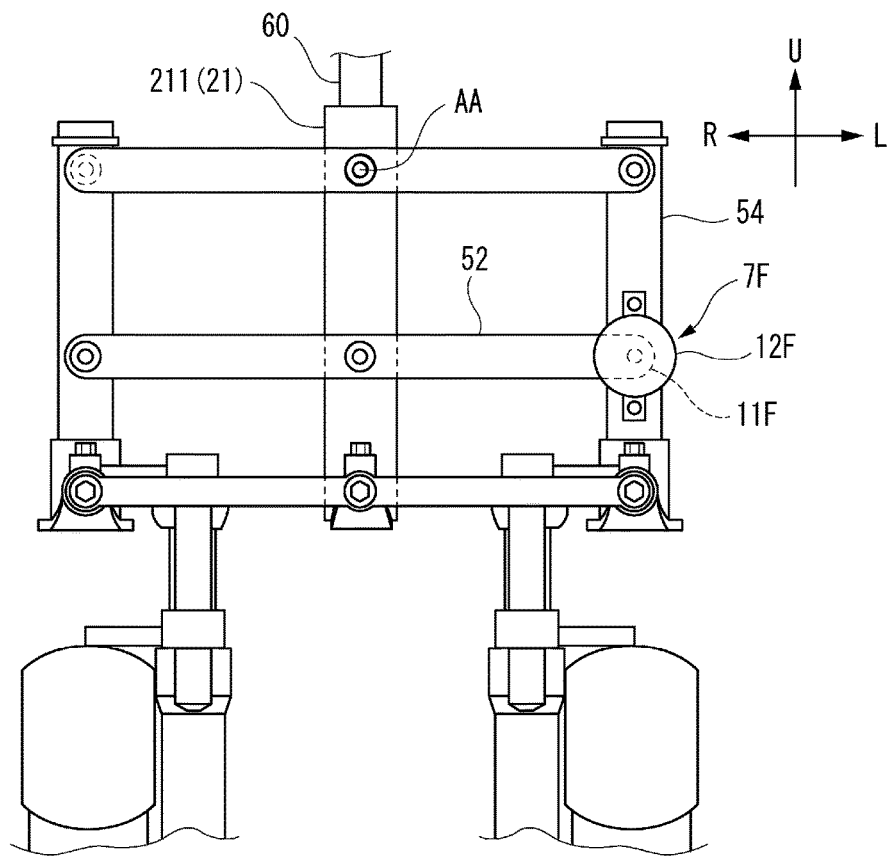
FIGS. 21A and 21B are drawings showing a state in which a portion of a vehicle according to a seventh preferred embodiment of the present invention is seen from the front thereof.
Figure 21B:
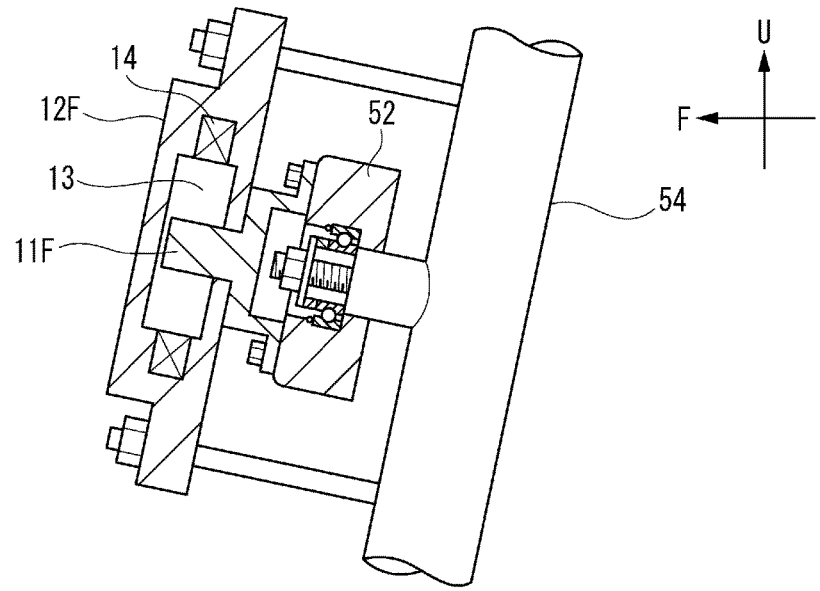

Next, referring to FIGS. 21A and 21B, a seventh preferred embodiment of the present invention will be described. FIG. 21A is a drawing showing a portion of the vehicle according to the seventh preferred embodiment as seen from the front in the direction of an upper middle axis AA. FIG. 21B is a drawing showing a portion of the vehicle according to the seventh preferred embodiment as seen from the top of a body frame 21.

A resisting force change mechanism 7F of the present preferred embodiment is preferably a so-called magnetic fluid brake mechanism. The magnetic fluid brake mechanism is disclosed in, for example, Japanese Patent Unexamined Publication JP-A-2010-167999.

The resisting force change mechanism 7F includes an outer tube 12F, a central shaft portion 11F that is provided in an interior of the outer tube 12F so as to rotate therein, a magnetic fluid that is filled in a fluid chamber 13 provided between the outer tube 12F and the central shaft portion 11F, and a coil 18. The magnetic fluid is a fluid of which the viscous characteristics are changed by a magnetic field. The outer tube 12F and the central shaft portion 11F rotate relatively about rotational axes that are parallel or substantially parallel to an upper center axis. The resisting force change mechanism 7F changes a resisting force against the relative rotation between the outer tube 12F and the central shaft portion 11F by changing the viscosity of the magnetic fluid by applying a magnetic field to the magnetic fluid with the coil 18.

In the resisting force change mechanism 7F of the present preferred embodiment, the central shaft portion 11F is fixed to a second cross member 52. The outer tube 12F is fixed to a second side member 54. When a body frame 21 leans, the second side member 54 turns about an upper left axis in relation to the second cross member 52. Because of this, the outer tube 12F rotates in relation to the central shaft 11F. The resisting force change mechanism 7F changes the ease with which the body frame 21 leans by changing a resisting force against a relative rotation between the outer tube 12F and the central shaft portion 11F by changing the viscosity of the magnetic fluid with the coil 18.

In the present preferred embodiment, too, as seen from the front in the direction of the upper middle axis AA, the central shaft portion 11F is provided in a position where it is superposed on the second cross member 52 at all times, and the outer tube 12F is provided in a position where it is superposed on the second side member 54 at all times. Because of this, as seen from the front in the direction of the upper middle axis AA, a movable range of the resisting force change mechanism 7F is smaller than a movable range of a link mechanism 5.

The central shaft portion 11F is fixed to the second cross member 52. The outer tube 12F is fixed to a second side member 54. The second cross member 52 turns about a lower left axis relative to the second side member 54. The central shaft portion 11F also rotates about the lower left axis relative to the outer tube 12F. Namely, they rotate on the same lower left axis, and therefore, the resisting force change mechanism 7F does not interfere with a link mechanism 5.

Further, as seen from a side of the vehicle, the central shaft portion 11F is provided in front of the steering shaft 60 and is provided in front of the second cross member 52 in relation to the direction of the upper middle axis AA. The outer tube 12F is provided in front of the steering shaft 60 and is provided at the front of the second side member 54. Namely, since the resisting force change mechanism 7F does not interfere with the link mechanism 5, the resisting force change mechanism 7F and the link mechanism 5 are disposed close to each other in relation to the direction of the upper middle axis AA. Because of this, even though the resisting force change mechanism 7F is installed in the vehicle, the periphery of the steering shaft 60 is difficult to be enlarged as seen from a side of the vehicle.

Thus, for the reasons described above, even though the resisting force change mechanism 7F is installed in the vehicle, the construction around the periphery of the steering shaft 60 that is above two front wheels 31, 32 is prevented from being enlarged in size.

Other Preferred Embodiments

In the preferred embodiments that have been described heretofore, the first portion of the resisting force change mechanism is preferably disposed in front of the steering shaft 60 and preferably disposed in front of the first side member 53, the second side member 54, the first cross member 51, and the second cross member 52. The second portion of the resisting force change mechanism is preferably disposed in front of the steering shaft 60 and disposed in front of the first side member 53, the second side member 54, the first cross member 51, the second cross member 52, and the body frame 21. However, the present invention is not limited thereto. Even though the first portion of the resisting force change mechanism is disposed behind the steering shaft 60 and disposed behind the first side member 53, the second side member 54, the first cross member 51, and the second cross member 52, and the second portion of the resisting force change mechanism is disposed behind the steering shaft 60 and disposed behind the first side member 53, the second side member 54, the first cross member 51, the second cross member 52, and the body frame 21, similar advantages to those of the first to seventh preferred embodiments can also be provided.

In the preferred embodiments described above, a portion of the link mechanism 5 is preferably supported on the headpipe 211. However, as long as a portion of the link mechanism 5 is supported on the body frame 21, for example, a configuration may be used in which the down frame 212 supports a portion of the link mechanism 5.

In the preferred embodiments described above, the first shock absorbing device 33 and the second shock absorbing device 35 preferably each include the telescopic shock absorber. However, the first shock absorbing device 33 and the second shock absorbing device 35 may each include a bottom-link shock absorber, for example.

In the individual preferred embodiments described above, the technique of changing the resisting force against the relative displacement of the portions (corresponding to the first portion and the second portion) of the resisting force change mechanism that are displaced relative to each other to suppress the deformation of the link mechanism 5 can be modified as required. The techniques described by reference to the individual preferred embodiments can be replaced mutually.

The preferred embodiments of the present invention can be applied to a scooter-type riding vehicle, for example, as long as the vehicle includes a body frame that can lean and two front wheels.

This application claims priority to Japanese Patent Application No. 2012-235605 filed on Oct. 25, 2012, the entire contents of which are incorporated herein by reference.

The terms and expressions that are used herein are used to describe various preferred embodiments of the present invention and hence should not be construed as limiting the scope of the invention. It should be understood that any equivalents to the characteristic matters that are shown and described herein should not be excluded and that various modifications within the scope of claims to be made later are permitted.

The present invention can be embodied in many different forms. It should be understood that the disclosure made herein provides the preferred embodiments based on the principle of the present invention. Based on the understanding that the preferred embodiments which are described and/or illustrated herein are not intended to limit the presnt invention thereto, several preferred embodiments are described and illustrated herein.

Several illustrated preferred embodiments of the invention are described herein. The present invention is not limited to those preferred embodiments described herein. The present invention includes every preferred embodiment which includes equivalent elements, modifications, deletions, combinations (for example, combination of characteristics of various preferred embodiments), improvements and/or alterations which those skilled in the art to which the present invention pertains can recognize based on the disclosure made herein. The limitative matters in claims should be construed broadly based on terms used in the claims and should not be limited to the preferred embodiments described in this description or those described during the prosecution of this patent application. Such preferred embodiments are interpreted to be non-exclusive. For example, in this disclosure, the terms "preferred" and "preferable" are non-exclusive terms and mean that "it is preferred but does not impose any limitation thereon" and "it is preferable but does not impose any limitation thereon".

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
  a body frame;
  a right front wheel and a left front wheel aligned side by side in a left-and-right direction of the body frame;
  a right shock absorbing device supporting the right front wheel at a lower portion thereof and configured to absorb a displacement of the right front wheel in an up-and-down direction of the body frame in relation to an upper portion thereof;
  a left shock absorbing device supporting the left front wheel at a lower portion thereof and configured to absorb a displacement of the left front wheel in the up-and-down direction of the body frame in relation to an upper portion thereof;
  a link mechanism including:
    a right side member supporting the upper portion of the right shock absorbing device so as to turn about a right steering axis extending in the up-and-down direction of the body frame;
    a left side member supporting the upper portion of the left shock absorbing device so as to turn about a left steering axis that is parallel or substantially parallel to the right steering axis;
    an upper cross member supporting an upper portion of the right side member at a right end portion thereof so as to turn about an upper right axis extending in a front-and-rear direction of the body frame, supporting an upper portion of the left side member at a left end portion thereof so as to turn about an upper left axis parallel or substantially parallel to the upper right axis, and supported on the body frame at a middle portion thereof so as to turn about an upper middle axis parallel or substantially parallel to the upper right axis and to the upper left axis; and
    a lower cross member supporting a lower portion of the right side member at a right end portion thereof so as to turn about a lower right axis parallel or substantially parallel to the upper right axis, supporting a lower portion of the left side member at a left end portion thereof so as to turn about a lower left axis parallel or substantially parallel to the upper left axis, and supported on the body frame at a middle portion thereof so as to turn about a lower middle axis parallel or substantially parallel to the upper middle axis;
  a steering shaft supported on the body frame between the right side member and the left side member in the left-and-right direction of the body frame, including an upper end portion provided above the lower middle axis in the up-and-down direction of the body frame, and able to turn about a middle steering axis extending in the up-and-down direction of the body frame;
  a handlebar provided at the upper end portion of the steering shaft;
  a turn transfer mechanism configured to transfer a turning motion of the steering shaft according to an operation of the handlebar to the right shock absorbing device and to the left shock absorbing device; and
  a resisting force change mechanism configured to change a resisting force exerted against turning operations of the upper cross member and the lower cross member in relation to the body frame; wherein
  the resisting force change mechanism includes a first portion and a second portion configured to be displaced relatively and configured to change a resisting force exerted against the relative displacement of the first portion and the second portion;

the first portion is supported on any one member of the right side member, the left side member, the upper cross member, and the lower cross member that are included in the link mechanism at a location where at least a portion thereof is superposed on the one member at all times as seen from a direction axially along the upper middle axis about which the upper cross member turns in relation to the body frame, and is aligned with one of a forward direction and a rearward direction of the one member and the steering shaft in relation to the direction of the upper middle axis about which the upper cross member turns in relation to the body frame, and the second portion is supported on any other member of the right side member, the left side member, the upper cross member, and the lower cross member that are displaced relative to the one member on which the first portion is supported at a location where at least a portion thereof is superposed on the other member at all times as seen from the direction axially along the upper middle axis about which the upper cross member turns in relation to the body frame, and is aligned with the other member in the same direction as the one direction of the first portion relative to the one member and the steering shaft in relation to the direction of the upper middle axis about which the upper cross member turns in relation to the body frame.

2. The vehicle according to claim 1, wherein the first portion is supported on the right side member at a location lower than a location where the right side member supports the lower cross member, or is supported on the left side member at a location lower than a location where the left side member supports the lower cross member.

3. The vehicle according to claim 1, wherein the resisting force change mechanism includes a friction imparting portion provided on either of the first portion and the second portion, the friction imparting portion is configured to impart a frictional force to the other of the first portion and the second portion, and the resisting force change mechanism is configured to change the resisting force against the relative displacement between the first portion and the second portion by adjusting the frictional force imparted by the friction imparting portion.

4. The vehicle according to claim 1, wherein the resisting force change mechanism includes a first fluid chamber configured to change a capacity thereof according to the relative movement between the first portion and the second portion, and a second fluid chamber configured to communicate with the first fluid chamber via a communication path, and to change the resisting force against the relative movement between the first portion and the second portion by restricting the movement of a fluid between the first fluid chamber and the second fluid chamber by adjusting a degree of opening of the communication path.

5. The vehicle according to claim 1, wherein a distance between the first portion and the second portion changes according to turning of the upper cross member or the lower cross member in relation to the body frame and the resisting force change mechanism is configured to change the resisting force exerted against the relative displacement of the first portion and the second portion according to a change in distance between the first portion and the second portion.

6. The vehicle according to claim 1, wherein turn angles of the first portion and the second portion change according to turning of the upper cross member or the lower cross member in relation to the body frame, and the resisting force change mechanism is configured to change the resisting force exerted against the turning operations of the upper cross member and the lower cross member in relation to the body frame according to a change in the turn angles of the first portion and the second portion.

\* \* \* \* \*